United States Patent [19]
Weidinger

[11] Patent Number: 5,579,881
[45] Date of Patent: Dec. 3, 1996

[54] FRICTION CLUTCH, SUCH AS FOR A MOTOR VEHICLE, WITH FLAT SPRING CHARACTERISTIC

[75] Inventor: Reinhold Weidinger, Unterspiesheim, Germany

[73] Assignee: Fichtel & Sachs AG, Schweinfurt, Germany

[21] Appl. No.: 275,341

[22] Filed: Jul. 14, 1994

[30] Foreign Application Priority Data

Jul. 16, 1993 [DE] Germany ..................... 43 23 857.2
Apr. 8, 1994 [DE] Germany ..................... 44 12 106.7

[51] Int. Cl.$^6$ .................................................. F16D 13/71
[52] U.S. Cl. ..................... 192/70.25; 192/70.27; 192/89.23; 192/89.25
[58] Field of Search ............... 192/89.23, 89.22, 192/89.25, 70.27, 70.25, 109 A, 111 A

[56] References Cited

U.S. PATENT DOCUMENTS

| | | |
|---|---|---|
| 2,117,482 | 5/1938 | Klix . |
| 3,340,974 | 9/1967 | Maucher . |
| 4,095,683 | 6/1978 | Ban ................................. 192/109 A X |
| 4,958,714 | 9/1990 | Cooke et al. .................... 192/70.25 X |
| 5,400,887 | 3/1995 | Mizukami et al. ............. 192/109 A X |
| 5,409,091 | 4/1995 | Reik et al. ........................... 192/70.25 |

FOREIGN PATENT DOCUMENTS

| | | |
|---|---|---|
| 1198214 | 8/1965 | Germany . |
| 4322506 | 1/1994 | Germany . |
| 4326501 | 2/1994 | Germany . |
| 0694105 | 7/1953 | United Kingdom . |
| 1248726 | 10/1971 | United Kingdom . |
| 2120329 | 11/1983 | United Kingdom . |

Primary Examiner—Rodney H. Bonck
Attorney, Agent, or Firm—Nils H. Ljungman & Associates

[57] ABSTRACT

A friction clutch with a cup spring which is actuated by a clutch release element similar to a membrane spring. A compact and simple construction can thereby be achieved with a very flat spring characteristic, whereby the clutch release element can be tuned so that it causes a significant reduction of the clutch release forces.

26 Claims, 14 Drawing Sheets

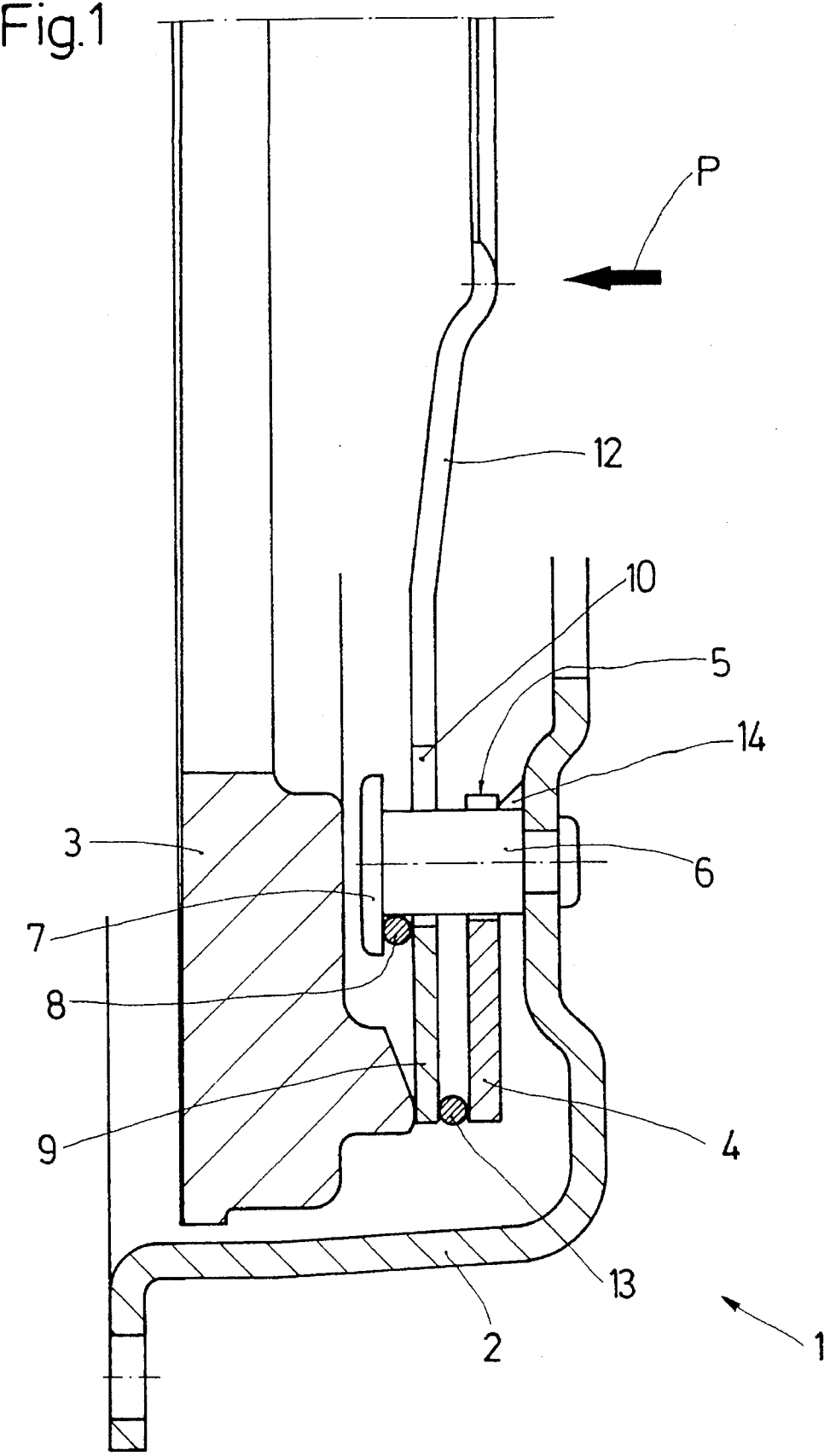

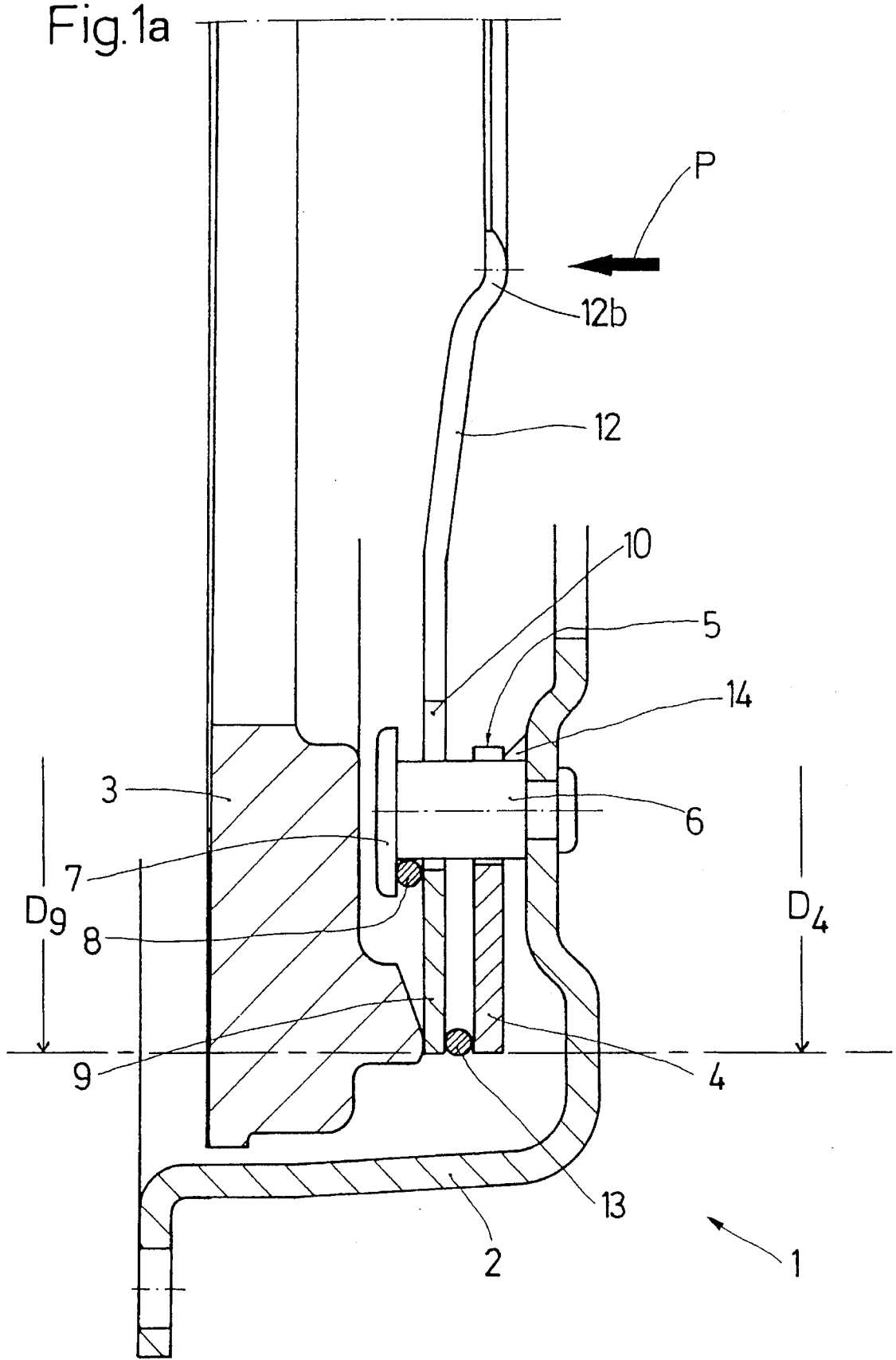

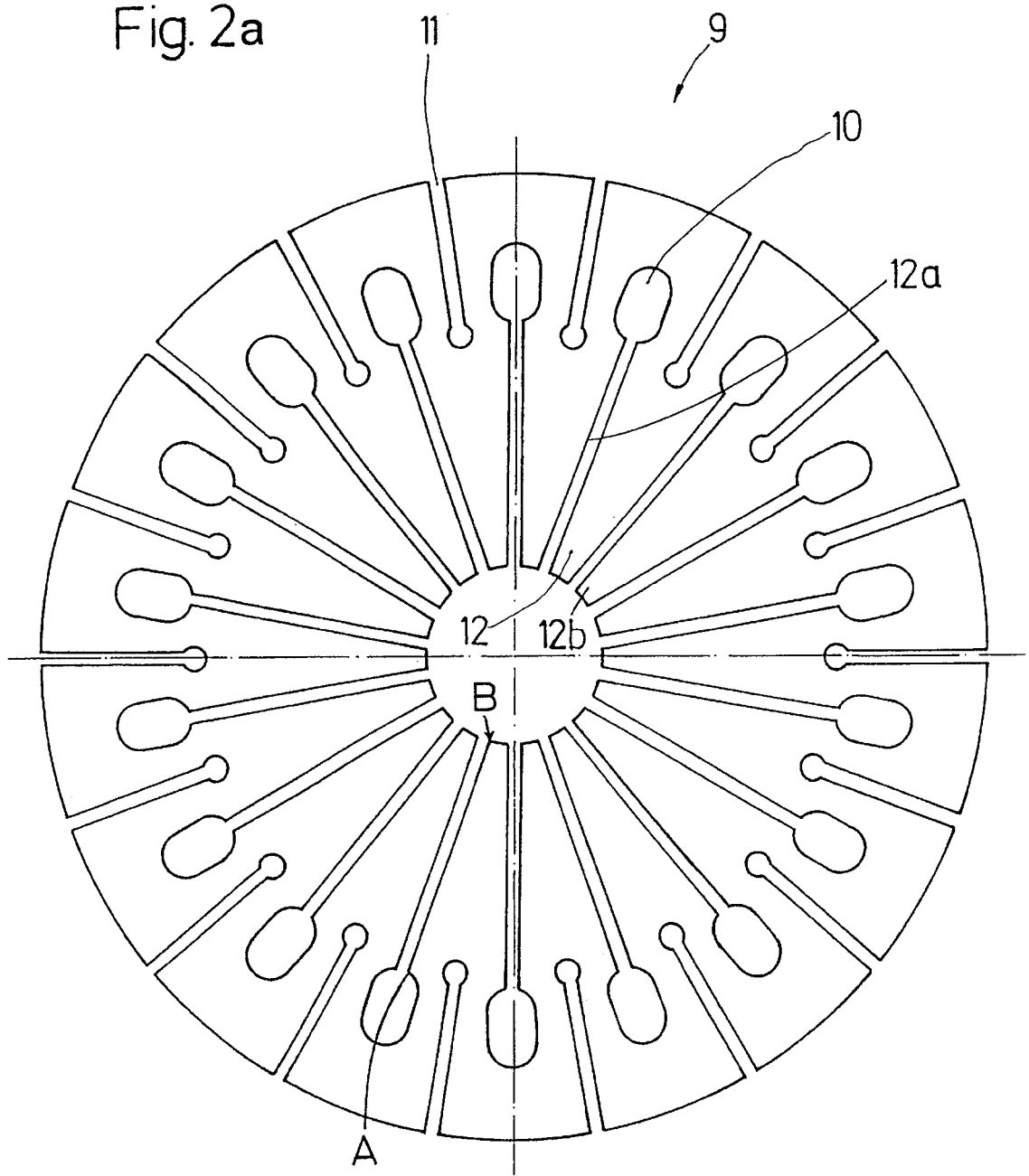

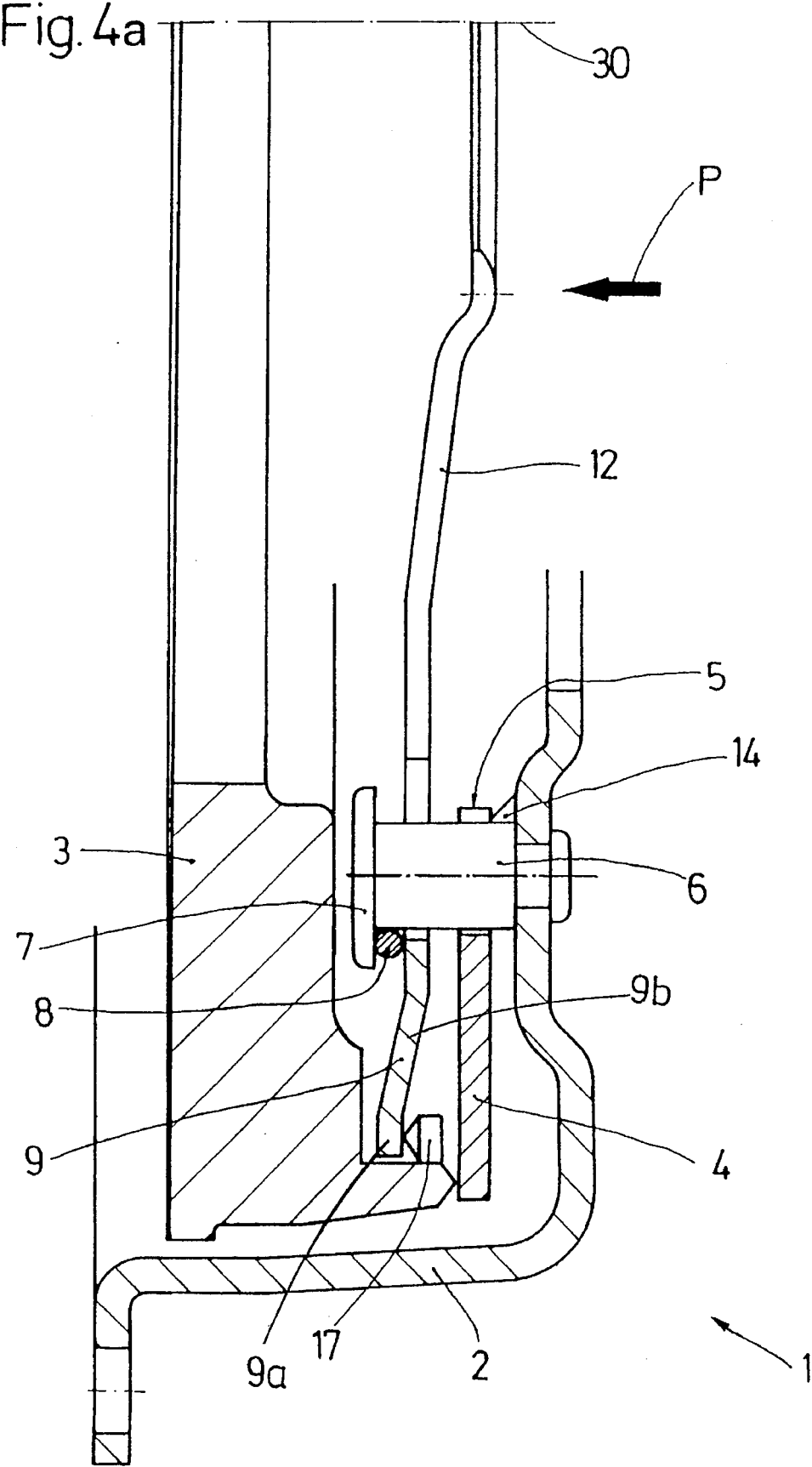

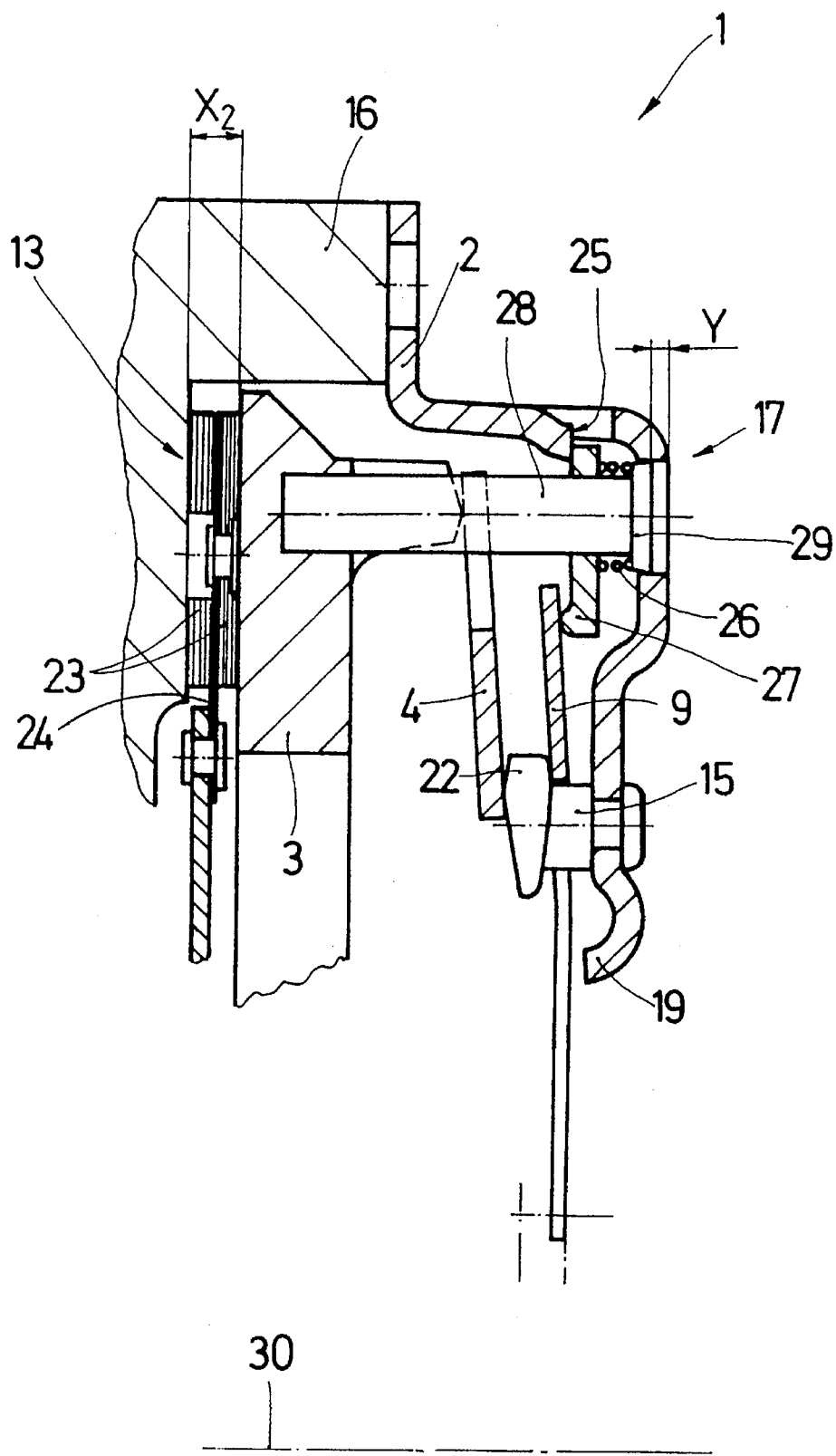

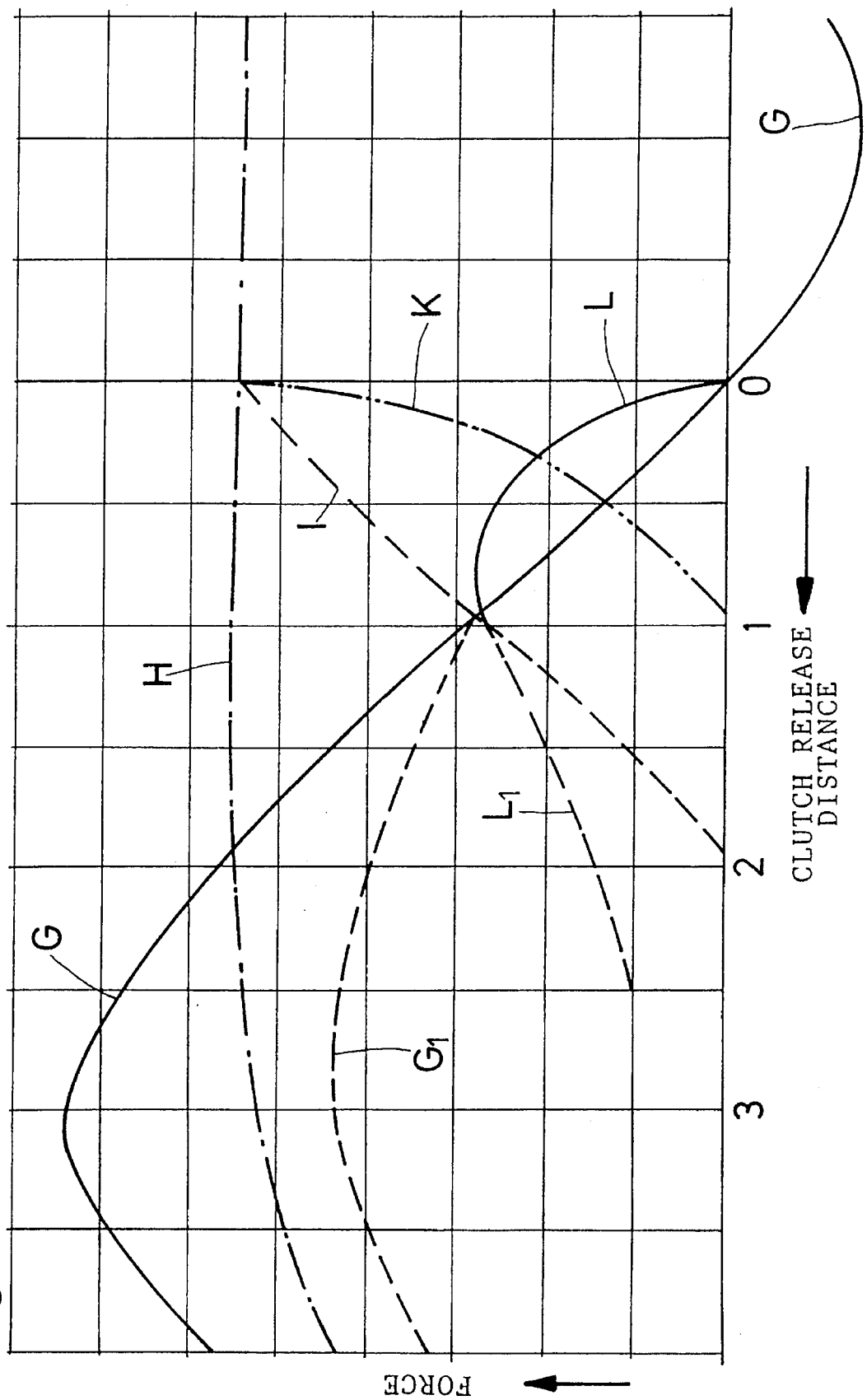

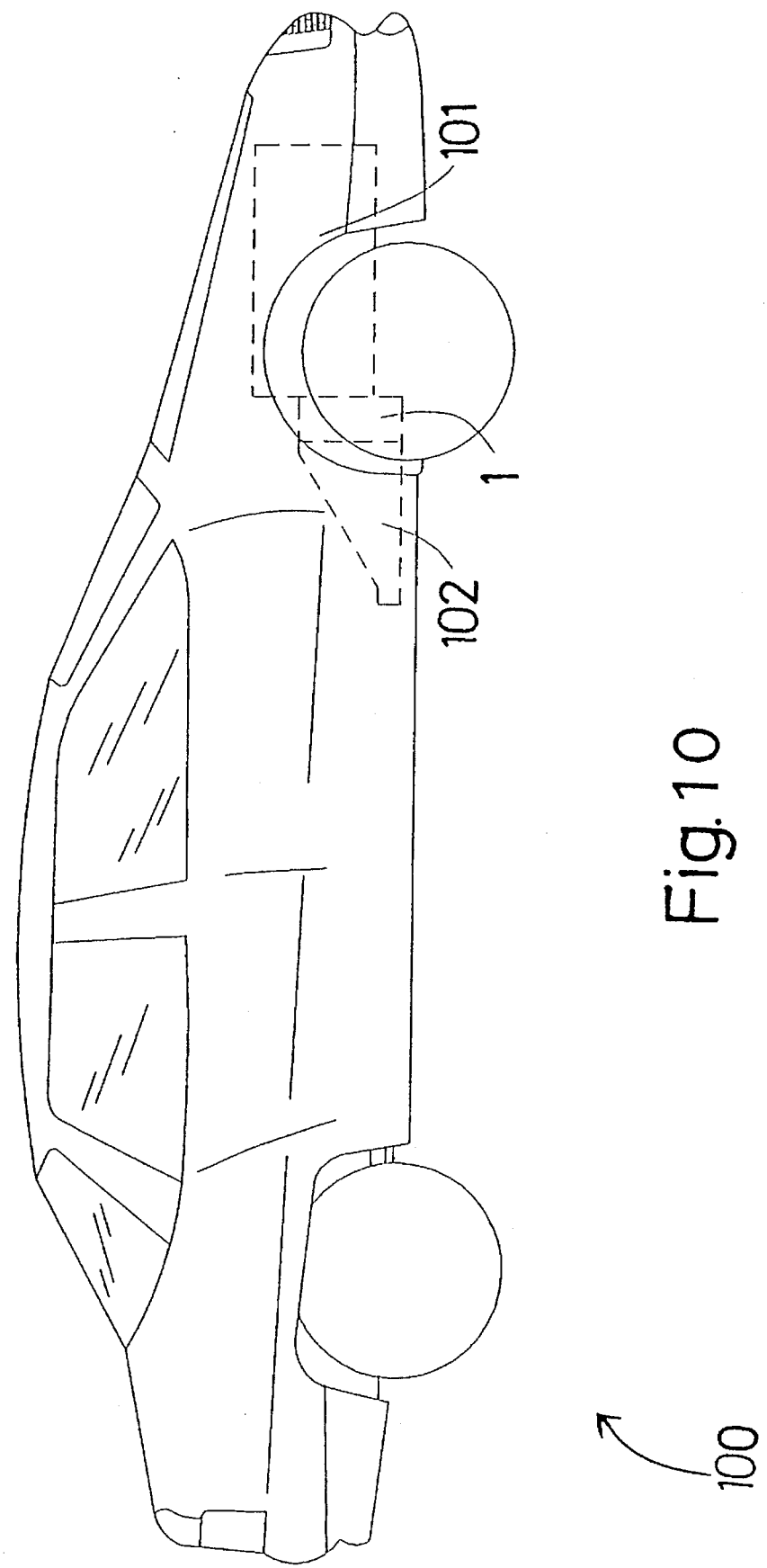

FRICTION CLUTCH, SUCH AS FOR A MOTOR VEHICLE, WITH FLAT SPRING CHARACTERISTIC

BACKGROUND OF THE INVENTION

1. Field of the Invention

This invention generally relates to a friction clutch having a thrust plate mounted in a housing so that the thrust plate cannot rotate but can move axially. The thrust plate is pressed toward a counterthrust plate by the force of a cup spring, a clutch disc having friction linings being interposed between the thrust plate and the counterthrust plate. The housing is fastened to the counterthrust plate, whereby the cup spring presses with its uninterrupted outside diameter against the thrust plate, and the cup spring is in contact with its inside diameter interrupted by notches, with the housing. The friction clutch also generally includes a clutch release mechanism to release the thrust plate against the force of the cup spring.

2. Background Information

Such a friction clutch is disclosed, for example, in U.S. Pat. No. 3,340,974. The friction clutch disclosed in the aforementioned United States patent generally includes a cup spring or diaphragm spring, which cup spring is supported by means of its continuous outside diameter on the thrust plate, and is located with its inside diameter, in which there are recesses to represent short flexible tongues, on the clutch housing. The thrust plate is actuated by means of radially-running levers which are mounted on the housing so that they can pivot, and which are also mechanically connected to tie bolts which are also mounted so that they can pivot. The ends of the levers pointing radially inward can be controlled by a clutch release system.

An advantage of such a cup spring clutch is the fact that the spring characteristic has a very extended curve, so that even when there is a large wear distance of the clutch, there is only a slight change in the application force. One disadvantage of such a cup spring clutch, however, is the relatively large technical effort and expense required to actuate the thrust plate. The various levers provided here with their pivot bearing are not only expensive to manufacture and install, but are also affected by friction, and typically require a relatively large amount of axial space to install.

OBJECT OF THE INVENTION

The object of the present invention is therefore to generally improve a friction clutch of the type described above so that, while retaining an at least equivalent function, a more compact design can be achieved, which compact design can simultaneously be manufactured more economically.

SUMMARY OF THE INVENTION

The invention teaches that this object can be achieved by means of a friction clutch having a thrust plate mounted in a housing so that the thrust plate cannot rotate but can move axially. The thrust plate is pressed toward a counterthrust plate by the force of a cup spring, and a clutch disc having friction linings is preferably interposed between the thrust plate and the counterthrust plate. The housing is fastened to the counterthrust plate, whereby the cup spring presses with its uninterrupted outside diameter against the thrust plate, and the cup spring is in contact with its inside diameter, interrupted by notches, with the housing. The friction clutch also generally includes a clutch release mechanism to release the thrust plate against the force of the cup spring.

Between the cup spring, which cup spring is preferably located in the conventional fashion, and the thrust plate, the present invention teaches that there can preferably be a clutch release element which clutch release element has the general shape of a membrane spring. The clutch release element can preferably be in contact with the thrust plate by means of its outside diameter, and can preferably have openings, preferably for the passage of spacer bolts. The clutch release element can also preferably have flexible tongues which extend radially for engagement with a clutch release system. The clutch release element is preferably supported on the housing by means of the heads of the spacer bolts. The outside diameter of the cup spring and release element can preferably be essentially equal, and between them there can preferably be a spacer or direct contact element.

By means of a friction clutch in accordance with the embodiments of the present invention, it is possible, at very low expense, to create a space-saving or compact actuation device for a cup spring clutch. The advantageous characteristics of the cup spring are utilized, along with the advantageous characteristics of a membrane spring, which advantages are to be seen in the low manufacturing expense, the small amount of axial space required, and in the strength at high speed.

The present invention also teaches that it is advantageous to provide the clutch release element with slots which preferably begin at the outer edge of the clutch release element and extend radially inward, the slots preferably extending at least to the vicinity of the openings for the passage of the spacer bolts. As a result of such a configuration of the clutch release element, a very flat characteristic is generated when the friction clutch is actuated, so that the influence of the release element is kept extremely small.

The present invention also teaches that the release element can preferably be provided with a slight axial prestress, such that contact with the spacer bolt heads is essentially guaranteed when the clutch is disengaged. As a result of this prestress, a second contact of the clutch release element is essentially unnecessary, which means that the structure of the entire releasing mechanism can be kept very simple. Therefore, as a preferable result of the above, there is preferably a characteristic curve for the clutch release element which typically results in a higher negative prestress with increasing wear of the friction lining. This prestress typically runs opposite to the spring characteristic of the cup spring, and thus overrides the spring characteristic of the cup spring in its ascending portion, so that the overall characteristic runs essentially horizontally, and thus, essentially no changes in application force occur over the wear distance.

The prestress on the clutch release element can thereby be designed so that when the friction clutch is disengaged, the prestress of the clutch release element is essentially eliminated. Thus, it is essentially guaranteed, on one hand, that the clutch release element, with the exception of the released state, essentially always has the same residual prestress, so that the clutch release element is held between the two support surfaces, and on the other hand, that the characteristic resulting from the clutch release element, in connection with the corresponding spring characteristic of the cup spring, forms an essentially straight and horizontal characteristic.

An additional improvement of the function of a friction clutch can be achieved on a friction clutch having a cup spring and a clutch release mechanism, which clutch release mechanism preferably has a component similar to a membrane spring. The membrane spring is preferably supported on the housing in the vicinity of its middle diameter preferably by means of spacer bolts. The membrane spring is preferably supported on the thrust plate in the vicinity of its outside diameter, and preferably has flexible tongues which tongues preferably point radially inward. The clutch release element, when the friction clutch is engaged, preferably exerts only a slight releasing force, and with increasing motion in the direction of a disengaged clutch, the releasing force decreases to approximately the value of zero. As a result of this arrangement, it is possible to have a space-saving actuation device for a cup spring clutch, at very low expense. The advantages of the force generated by a cup spring are utilized, which lie in the fact that such a spring can have a very flat spring characteristic. At the same time, the advantageous characteristics of the actuation element similar to a membrane spring are utilized, namely its economical manufacture, the small amount of axial space required and its strength at high speed.

The present invention teaches that it is also possible to achieve a functional improvement of a friction clutch by having the clutch release element interact with a wear compensation device which, when there is wear on the friction linings, preferably influences the curve of the clutch releasing force only insignificantly or not at all. This characteristic of the wear compensation device essentially guarantees that the releasing force set when the friction clutch is engaged does not increase during operation. The force curves thus preferably remain in their most favorable position for the entire useful life of the friction clutch.

The wear compensation device is thereby advantageously placed between the outside diameter of the clutch release element and the thrust plate. Theoretically, it can also be located elsewhere, e.g. on the support which is fastened to the housing, or between the outside diameter of the clutch release element and the cup spring.

With regard to the object of the present invention, the function of a friction clutch with a cup spring to generate the thrust force can also be improved, if the clutch release mechanism comprises a clutch release element which has a component similar to a membrane spring, which membrane spring is preferably designed and oriented so that when the friction clutch is engaged, the membrane spring exerts little or no releasing force, and with increasing motion in the direction of a disengaged clutch there is an increase in the releasing force.

As a result of the configuration of the clutch release mechanism in accordance with the embodiments of the present invention, it is possible to significantly reduce the clutch release force, and thus to make the operation of the friction clutch easier. The spring characteristic of the cup spring can also preferably be designed to be flat, so that when the clutch is actuated, an overall characteristic which decreases with increasing disengagement distance can be achieved. If it is taken into consideration that when there is a spring system or padding for the friction lining of the clutch disc, these friction linings can assist the clutch release force during the clutch release process. Thus, the friction linings can also contribute partly to the reduction of the operating forces, it becomes possible to achieve an actuation force which is sharply reduced overall. Thus, not only is operation made easier for the driver, but also for all of the transmission elements from the clutch pedal to the friction clutch.

When there is a wear compensation device which interacts with the clutch release element, in accordance with at least one embodiment of the present invention, it can essentially be guaranteed that when there is wear of the friction linings, the position of the clutch release element in relation to the stationary parts of the clutch essentially remains constant, so that the force exerted by the clutch release element on the thrust plate essentially always remains constant, regardless of the wear of the friction linings. It can thereby be essentially guaranteed that over the entire useful life of the friction clutch, the forces to be applied during actuation of the clutch essentially remain constant.

The wear compensation device, in at least one embodiment of the present invention, can thereby be advantageously located between the outside diameter of the clutch release element and the thrust plate, or possibly between the outside diameter of the clutch release element and the cup spring.

The present invention also teaches that the clutch release element can preferably be provided with numerous openings which are distributed over the circumference, and through which openings spacer bolts preferably extend, which spacer blots are preferably fastened to the clutch housing in a stationary manner. The clutch release element, in its middle portion, is preferably supported on the heads of the spacer bolts on one hand, and on the other hand, in the vicinity of its outside diameter, on the thrust plate.

With regard to a simple configuration and simple installation of a friction clutch configured in accordance with the present invention, the present invention teaches that the release element, when the friction clutch is engaged, preferably exerts a defined low releasing force on the thrust plate. Thus, a secure, unilateral contact with the heads of the spacer bolts can be essentially guaranteed. This construction makes possible the unilateral contact of the clutch release element with the heads of the spacer bolts on one side. Therefore, essentially no clamping elements are necessary on the opposite side of the clutch release element.

The present invention also teaches that, to further simplify the design, the cup spring can preferably be supported on one side on the thrust plate and on the other side on the heads of the spacer bolts. In this manner, the spacer bolts can preferably be used to support both the cup spring and the clutch release element.

The spacer bolts thereby preferably extend, starting from the clutch housing, toward the thrust plate. The clutch release element is preferably in contact with the side of the heads of the spacer bolts facing the clutch housing, and the cup spring with the side facing the thrust plate. The spacer bolts can thereby exert a double function, and the entire device, viewed in the axial direction, can be designed very compactly.

The cup spring is thereby preferably in contact with its inside diameter with the spacer bolts, and with its outside diameter, the cup spring is preferably in contact with the thrust plate. In this manner, the space located radially outside the spacer bolts can preferably be used both for the clutch release element and for the cup spring.

The wear compensation device, in accordance with at least one embodiment of the present invention, can preferably include several bolts distributed on the circumference of the thrust plate, which bolts are preferably disposed in a direction parallel to the axis of rotation, and which bolts generally extend towards the clutch housing. The bolts are also preferably disposed radially outside the release element and point away from the friction surfaces. Each bolt preferably extends through a lever, which lever can be fastened to the bolt by a clamping force. Each lever, in areas which are preferably located adjacent the corresponding bolt of the clutch release element, and which areas point radially inward and radially outward from the corresponding bolt, is preferably in contact with a spring. The spring preferably applies stress to each lever towards the friction surfaces, until the lever makes contact with a housing stop. Contact between the lever and the housing stop is preferably made in a terminal area of the levers pointing radially outward, radially outside the corresponding bolt of the clutch release element. This design can essentially guarantee that the position of the release element remains essentially constant in relation to the clutch housing, even when there is wear on the friction linings, preferably so that the releasing force exerted by the clutch release element on the thrust plate remains constant, regardless of the wear status of the friction clutch.

Although the sharp reduction of the release force in the terminal area of the clutch release distance is in itself desirable, the invention does not carry this reduction to a point where the force of the cup spring and the force of the clutch release element begin to cancel one another out. Preferably, in order to avoid the cancelling out of forces of the cup spring and the release element, the invention teaches that each head of a spacer bolt, on the side in contact with the release element, preferably has a contour which effects a radial shifting of the support diameter during the clutch release process from a larger value to a smaller value. As a result of this modified translation, in the terminal portion of the release distance, the clutch release force decreases with a reduced gradient. It can thereby essentially be guaranteed that the force of the clutch release element and the force of the cup spring do not cancel one another cut.

The present invention also teaches that the clutch release element, when the pressure plate is being installed in the clutch or is being shipped, can preferably be installed in such a position that the clutch release element tends to exert an engagement force on the thrust plate, whereby radially outside the spacer bolts a lever comes into contact with stops on the clutch housing as a result of the residual stress.

One aspect of the invention resides broadly in a friction clutch, such as for a motor vehicle, the friction clutch comprising: a clutch disc having an axis of rotation; a pressure plate; a housing; the pressure plate having means for being mounted for axial movement in the housing with respect to the clutch disc; first spring means for biasing the pressure plate towards the clutch disc, the first spring means having an outermost diameter disposed maximally from the axis of rotation; second spring means for biasing the pressure plate away from the clutch disc, the second spring means having an outermost diameter disposed maximally from the axis of rotation; means for supporting the first spring means and the second spring means with respect to the housing; the second spring means being disposed between the pressure plate and the first spring means; said first spring means having means for receiving the means for supporting, the means for supporting being disposed in the receiving means of the first spring means; the second spring means having means for receiving the means for supporting, the means for supporting being disposed in the receiving means of the second spring means; means for maintaining the first spring means and the second spring means in a spaced apart relationship with one another, the means for maintaining being disposed between said the first spring means and the second spring means; and the outermost diameter of the first spring means being substantially equal to the outermost diameter of the second spring means.

Another aspect of the invention resides broadly in a friction clutch, such as for a motor vehicle, the friction clutch comprising: a clutch disc having an axis of rotation; a pressure plate; a housing; the pressure plate having means for being mounted for axial movement in the housing with respect to the clutch disc; first spring means for biasing the pressure plate towards the clutch disc; second spring means for biasing the pressure plate away from the clutch disc, the second spring means having an outermost diameter disposed maximally from the axis of rotation; means for supporting the first spring means and the second spring means with respect to the housing; the second spring means having means for receiving the means for supporting, the means for supporting being disposed in the receiving means; and the pressure plate having an engaged position upon being engaged with the clutch disc, and a disengaged position upon being disengaged from the clutch disc, and the pressure plate having a plurality of positions in between the engaged position and the disengaged position; the second spring means being configured to exert a force on the pressure plate to cause the pressure plate to move in a direction away from the clutch disc when the pressure plate is in the engaged position, the second spring means exerting a decreasing force on the pressure plate as the pressure plate moves from the engaged position to the disengaged position.

A yet additional aspect of the invention resides broadly in a friction clutch, such as for a motor vehicle, the friction clutch comprising: a clutch disc having an axis of rotation; a pressure plate; a housing; the pressure plate having means for being mounted for axial movement in the housing with respect to the clutch disc; first spring means for biasing the pressure plate towards the clutch disc; second spring means for biasing the pressure plate away from the clutch disc; the pressure plate having an engaged position upon being engaged with the clutch disc and a disengaged position upon being disengaged from the clutch disc, and the pressure plate having a plurality of positions in between the engaged position and the disengaged position; and the second spring means being configured to exert a force on the pressure plate to cause the pressure plate to move in a direction away from the clutch disc when the pressure plate is in engaged position, the second spring means exerting an increasing force on the pressure plate as the pressure plate moves from the engaged position to the disengaged position.

BRIEF DESCRIPTION OF THE DRAWINGS

The invention is explained in greater detail below with reference to embodiments illustrated in the accompanying figures, in which:

FIG. 1 shows the lower half of a longitudinal section through a friction clutch;

FIG. 1a shows substantially the same view as FIG. 1, but shows additional components;

FIG. 2a shows substantially the same view as FIG. 2, but shows additional components;

FIG. 4a shows substantially the same view as FIG. 4, but shows additional components;

FIGS. 5, 6, 6a, 7 and 8 show the transport position as well as the sequence of motions of an additional variant;

FIG. 9 shows the characteristic force curve of the individual parts and the overall characteristic of FIGS. 5 to 8; and FIG. 10 shows a typical motor vehicle incorporating the present invention.

DESCRIPTION OF THE PREFERRED EMBODIMENT

Figure 2:
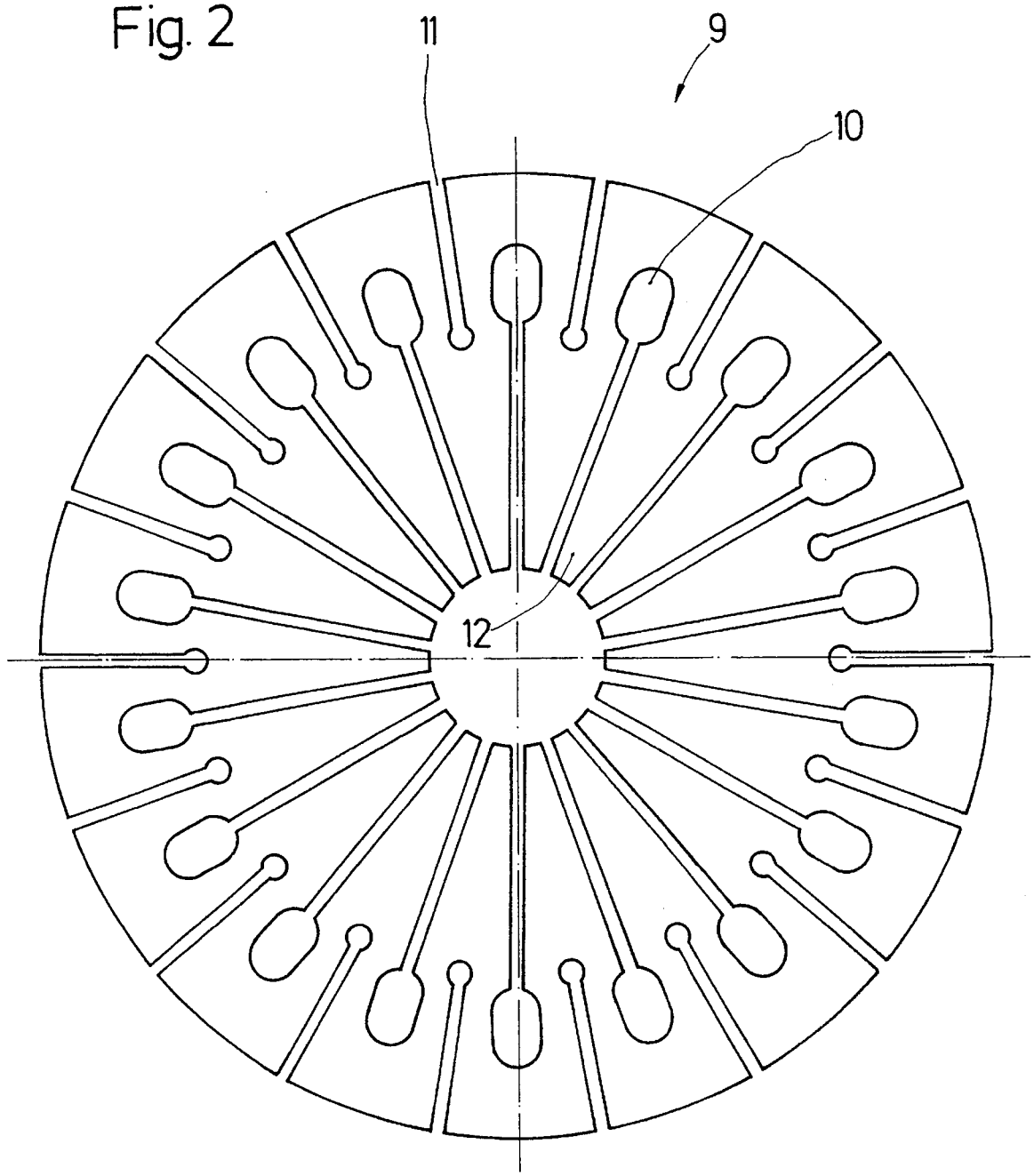
FIG. 2 shows a plan view of the clutch release element.

FIG. 1 is a schematic illustration of the construction of the friction clutch 1. There is preferably a housing 2, which housing 2 is preferably bolted to a counterthrust plate (not shown), which counterthrust plate can preferably be in the form of a flywheel. Inside the housing 2 is a thrust plate 3, which thrust plate 3 is preferably connected to the housing 2 in a non-rotational but axially-movable manner. Such a non-rotational connection can be made, for example, by means of tangential leaf springs. Such a connection is well known in the art and will not be discussed further here.

Between the thrust plate 3 and the housing 2 are, on one hand, a cup spring 4 which, by means of an appropriate prestress in the vicinity of the outside diameter $D_4$ (see FIG. 1a) of the cup spring 4, preferably applies a force to the thrust plate 3 in the direction of a counterthrust plate (not shown in FIGS. 1 and 1a but which is shown in FIGS. 5–8 as indicated by reference numeral 16), or in the direction as indicated by P. The cup spring 4 is also preferably in contact, in the vicinity of its inside diameter, with an abutment 14. The abutment 14 is preferably located on the housing 2. The cup spring 4 can preferably have, in a radially inner area, numerous notches 5 distributed on the circumference. The notches 5, to a certain extent, can preferably influence the spring characteristic of the cup spring 4.

Several spacer bolts 6 are preferably located in the housing 2, and are distributed over the circumference of the housing, which spacer bolts 6 are preferably riveted into the housing 2. The spacer bolts 6 preferably penetrate the cup spring 4 in the axial direction, namely in the vicinity of a corresponding notch 5. The spacer bolts 6, preferably in an area close to the thrust plate 3, each preferably have a head 7.

Preferably between the cup spring 4 and the thrust plate 3, there is a clutch release element 9, which clutch release element 9 is illustrated in a plan view in FIG. 2. The clutch release element 9 is preferably constructed in a manner similar to a membrane spring, and preferably has openings 10 distributed on the circumference, through which the spacer bolts 6 can preferably extend. The clutch release element 9, in the vicinity of the openings 10, is preferably supported in the axial direction, with the interposition of a wire ring 8, on the heads 7 of the spacer bolts 6. The outside diameter $D_9$ (see FIG. 1a) of the clutch release element 9 is preferably approximately the same as the outside diameter $D_4$ of the cup spring 4, and between the two there is also a wire ring 13, which wire ring 13 preferably acts as a spacer or direct contact mechanism.

Radially inside the openings 10, the clutch release element 9 can preferably be provided with individual flexible tongues 12 which tongues 12 are preferably separated from one another circumferentially by corresponding slots 12a (see FIG. 2a) which slots 12a preferably run in the radial direction. The slots 12a each can preferably terminate in an opening 10. Starting from the outside diameter $D_9$ of the release element 9, there are slots 11 preferably running radially inward, which slots 11 preferably run between each two neighboring openings 10 and can preferably end approximately in the radial vicinity of the openings 10.

It should be understood that the embodiment shown in FIGS. 1 and 1a can preferably have a surrounding structure similar to that shown in FIGS. 5 through 8.

The friction clutch 1 can preferably operate as follows: FIG. 1 shows the engaged state of the friction clutch 1. The cup spring 4 can preferably be installed with prestress, so that the cup spring 4 is preferably in contact, in the vicinity of its inside diameter, with the abutment 14 on the housing 2. In the vicinity of the outside diameter $D_4$ of the cup spring 4, preferably by means of the wire ring 13 and by means of the outside diameter $D_9$ of the clutch release element 9, the cup spring 4 preferably acts on the thrust plate 3, so that the thrust plate 3 is prestressed toward the counterthrust plate or possibly in a direction corresponding to P, so that a clutch disc (not shown in FIG. 1) is preferably braced between the thrust plate 3 and the counterthrust plate, and can be driven by friction.

The clutch release element 9 can preferably be installed with a slight prestress, so that as a result of the force of the cup spring 4, the clutch release element 9 is braced between the wire ring 13 and the thrust plate 3, and is held by means of residual stress against the wire ring 8 in relation to the heads 7 of the spacer bolts 6. To release the friction clutch 1, a force in the direction of the arrow P can preferably be exerted on the ends 12b (see FIG. 1a) of the flexible tongues 12, so that the clutch release element 9 can be tipped around a tipping circle, represented by the wire ring 8, so that the outside diameter $D_9$ of the clutch release element 9 preferably executes a motion essentially opposite to the direction of the arrow P to oppose the spring force of the cup spring 4 on the thrust plate 3 and thereby enable the wire ring 13 and the cup spring 4 to execute a releasing motion. The thrust plate 3 is thereby released from an axial prestress force, and can preferably release the clutch disc. The clutch engagement process takes place in the reverse direction, or essentially by releasing pressure P so that cup spring 4 can thereby reengage the thrust plate 3 with the counterthrust plate.

Figure 3:
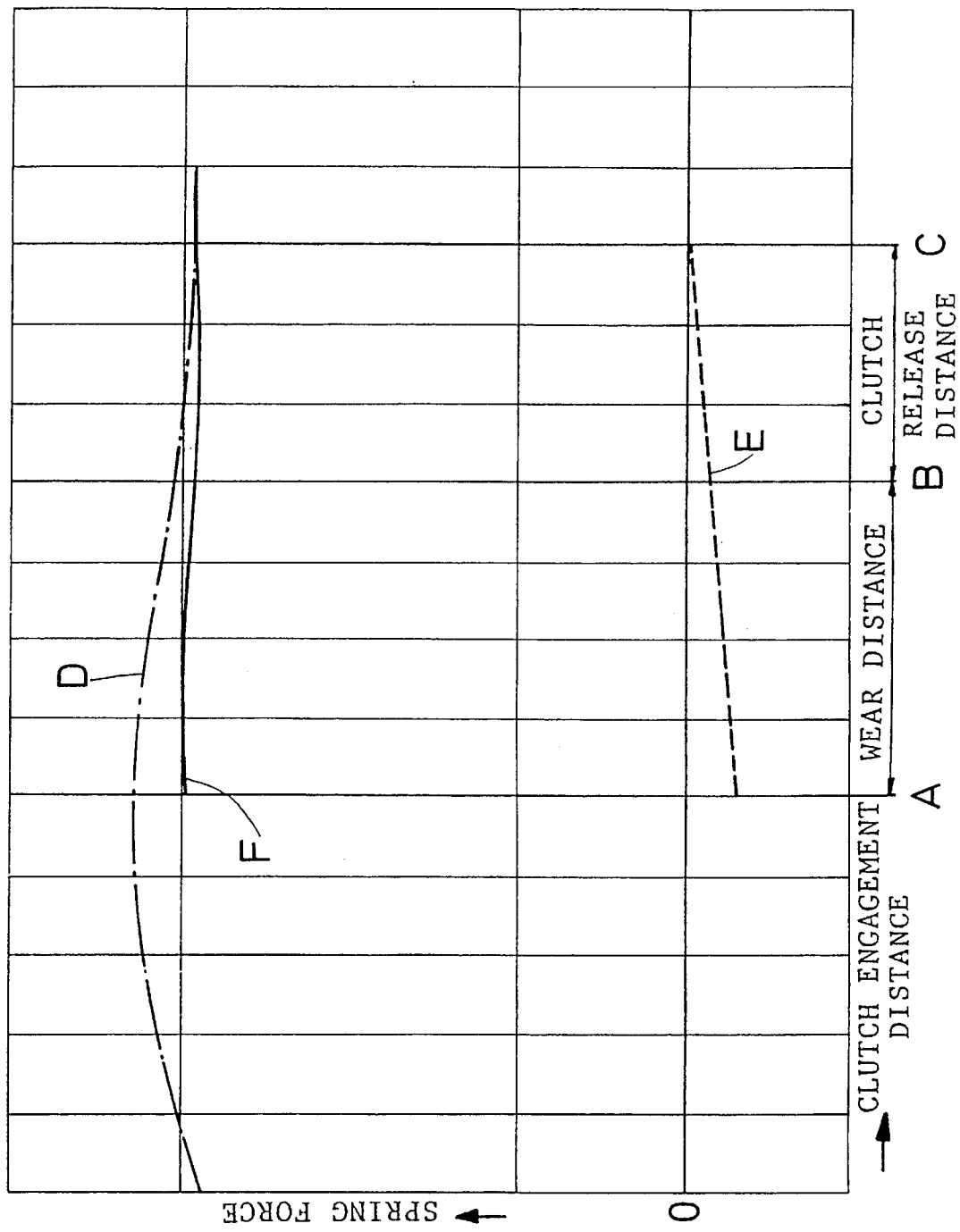
FIG. 3 shows the characteristic force curve of the individual parts as well as the overall characteristic force curve.

FIG. 3 shows how the clutch engagement and release motions are executed in terms of the forces involved. In the illustrated diagram shown in FIG. 3, the spring force is plotted over the actuation distance of the thrust plate 3, or the clutch engagement distance. It is thereby apparent that the characteristic E of the clutch release element 9 runs from Position C corresponding to the released state, in which the prestress is essentially 0, into the negative force area. The curve of characteristic E is essentially linear. The curve of characteristic E then adjoins the clutch release distance, which runs from Point C toward Point B for a large wear distance, and which eventually runs to Point A. Over the entire actuation distance, which is a combination of the clutch release distance and the wear distance, the spring characteristic D of the cup spring 4 preferably runs in the manner of clutches used in the past, so that in the engagement direction, the spring force increases slightly, and reaches the highest point approximately in the vicinity of the maximum wear distance at Point A, and then the spring characteristic typically descends again. Thus, the curve of the spring characteristic D of the cup spring 4, in accordance with at least one embodiment of the present invention, can be essentially non-linear. As a result of the curve of characteristic E of the clutch release element 9, which runs essentially opposite to the spring characteristic D, there is an overall characteristic F which runs practically horizontally, and which makes it possible to realize an essentially constant application force on the clutch disc essentially over the entire wear distance.

A friction clutch equipped in this manner described above can therefore be tuned very accurately to the maximum torque to be transmitted, and need not work with a greater safety margin for safety reasons. In addition to the simple basic construction, such a clutch can also have a relatively small overall or compact construction. The tuning of the characteristic of the clutch release element 9 should therefore be made so that when the friction clutch 1 is fully disengaged at Point C, the prestress is essentially eliminated, as shown by the characteristic curve E (intersection with the base line at C). In other words, by forming the clutch release element 9, as best shown in FIGS. 2 and 2a, to have about 18 slots 11 and about 18 tongues 12, and by placing the slots 11 and the tongues 12 in an alternating fashion, the prestress of the clutch release element 9 should essentially be eliminated when the friction clutch 1 is fully disengaged. It is important that the clutch release element 9, when the clutch 1 is engaged and also over the entire wear distance, is held by residual stress on the heads 7 of the spacer bolts 6, so that a second support for the clutch release element 9 is essentially unnecessary.

Thus, the negative force exerted by the clutch release element 9 can, in accordance with at least one embodiment of the present invention, balance out the positive force of the cup spring 4 over essentially the entire wear distance, in order to keep the application force essentially constant over the entire life of the clutch.

In accordance with an alternative embodiment of the present invention, the curve of the spring characteristic of the cup spring 4 may be linear, while the curve of the spring characteristic of the clutch release element 9 may be non-linear, with one being positive and one being negative. Thus, the two forces can balance one another out, and preferably result in an essentially constant application force.

In accordance with another alternative embodiment of the present invention, the curve of the spring characteristic of the cup spring 4 and the curve of the spring characteristic of the release element 9 could both be linear, one being positive and the other negative. Thus, the two forces can balance one another In accordance with yet an additional embodiment of the present invention, the curve of the spring characteristic of the cup spring 4 and the curve of the spring characteristic of the release element 9 could both be non-linear, one being positive and the other negative. Thus, the two forces can balance one another out.

Figure 4:
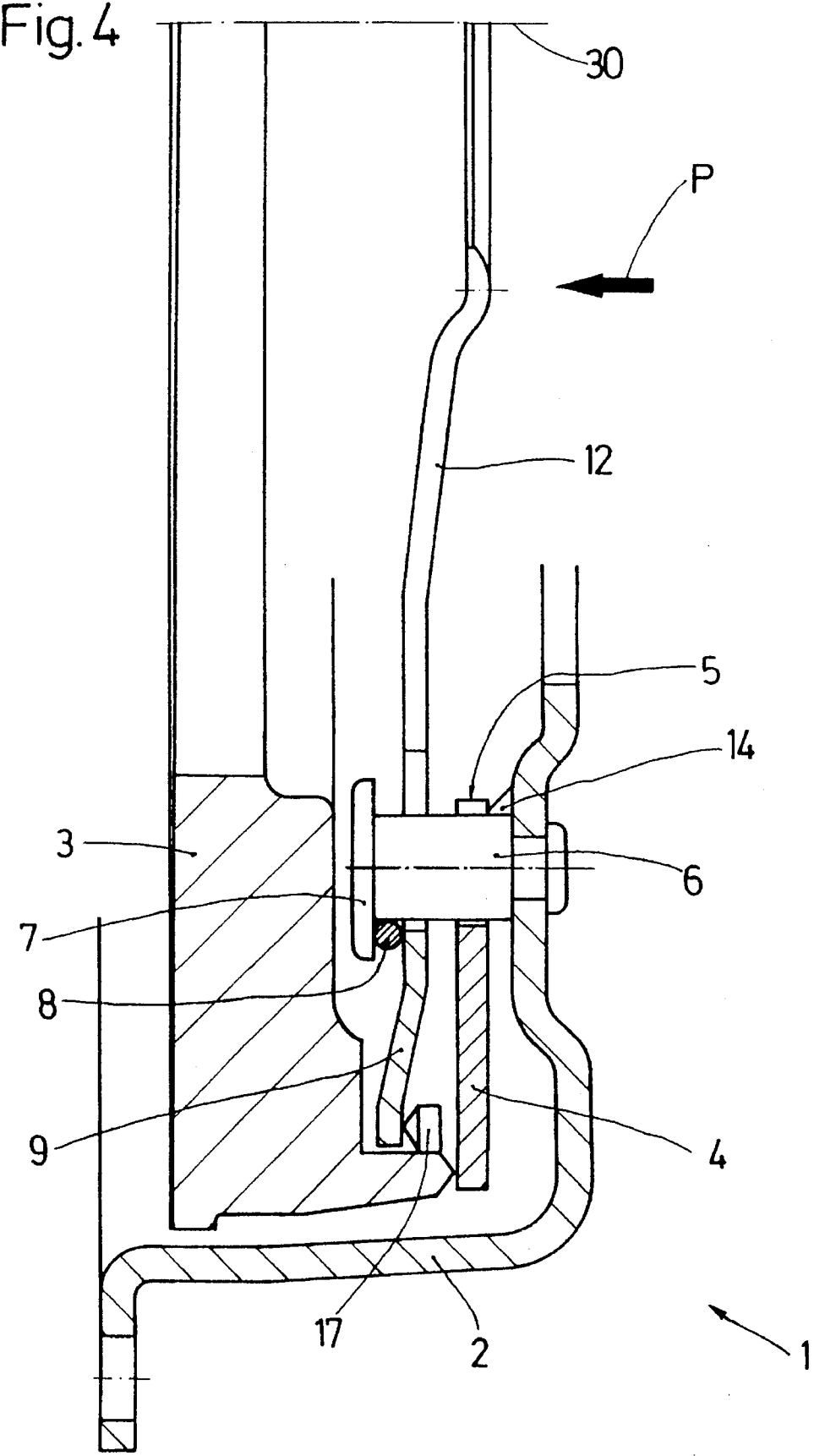
FIG. 4 shows a variant of FIG. 1.

FIGS. 4 and 4a illustrate a variant of FIG. 1. In contrast to FIG. 1, FIG. 4 illustrates a friction clutch 1 in which the cup spring 4 preferably acts directly on the thrust plate 3, and the clutch release element 9 also preferably acts directly on the thrust plate 3, namely at another point. In the outside diameter region 9a (see FIG. 4a) of the clutch release element 9, between the latter and the thrust plate 3, and preferably between the clutch release element 9 and the cup spring 4, there can preferably be a wear compensation device 17 which can essentially guarantee that, with increasing wear of the friction linings of the clutch disc (not shown in FIGS. 4 and 4a), and with the corresponding movement of the thrust plate 3 away from the spacer bolts 6, the position of the clutch release element 9 can essentially remain constant in relation to the clutch housing 2 and the spacer bolts 6. The essentially unchanged position of the clutch release element 9 in turn essentially guarantees that even in the event of increasing wear of the friction linings, the characteristic E of the clutch release element 9 will essentially remain in the position illustrated in FIG. 3.

In accordance with the embodiment of the clutch 1 illustrated in FIGS. 4 and 4a, the clutch release element can preferably have an angled portion 9b (see FIG. 4a) which preferably extends slightly towards the thrust plate 3.

The wear compensation device 17 can preferably be positioned, in at least one embodiment of the present invention, between the clutch release element 9 and the cup spring 4 and the wear compensation device 17 can preferably be attached to the thrust plate 3. With such a device 17, the cup spring 4 preferably directly moves the thrust plate 3, and not the release element 9, as was the case in the embodiment shown in FIGS. 1 and 1a.

With regard to the embodiments of the present invention illustrated in FIGS. 1–4a, when the clutch pedal inside the motor vehicle is depressed by the operator, the prestress on the clutch release element 9 preferably decreases so little force is needed to keep the clutch disengaged (i.e. when the pedal is completely depressed), thus making operation of the clutch easier for the operator, especially during traffic when frequent stopping and starting is necessary.

It is to be understood that the embodiment of the friction clutch 1 shown in FIGS. 4 and 4a can preferably have surrounding structures similar to that shown in FIGS. 5 through 8.

A variant of a friction clutch 1 is illustrated in FIGS. 5 to 8. The structure of the embodiment of the present invention illustrated in FIGS. 5 through 8 will be described immediately herebelow. A more detailed description of the embodiment shown in FIG. 5 will be presented further below.

Figure 6:
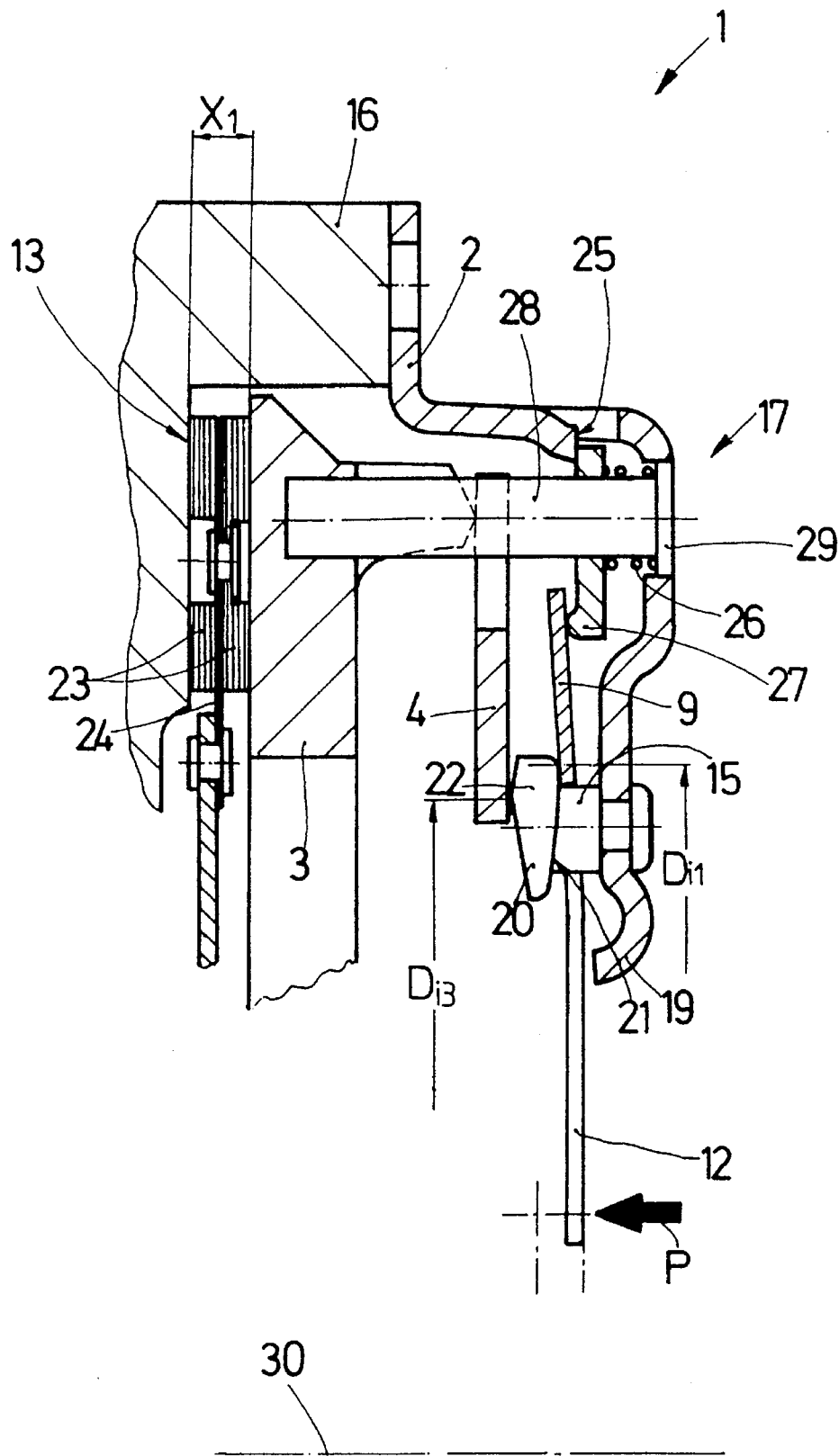
Figure 6A:
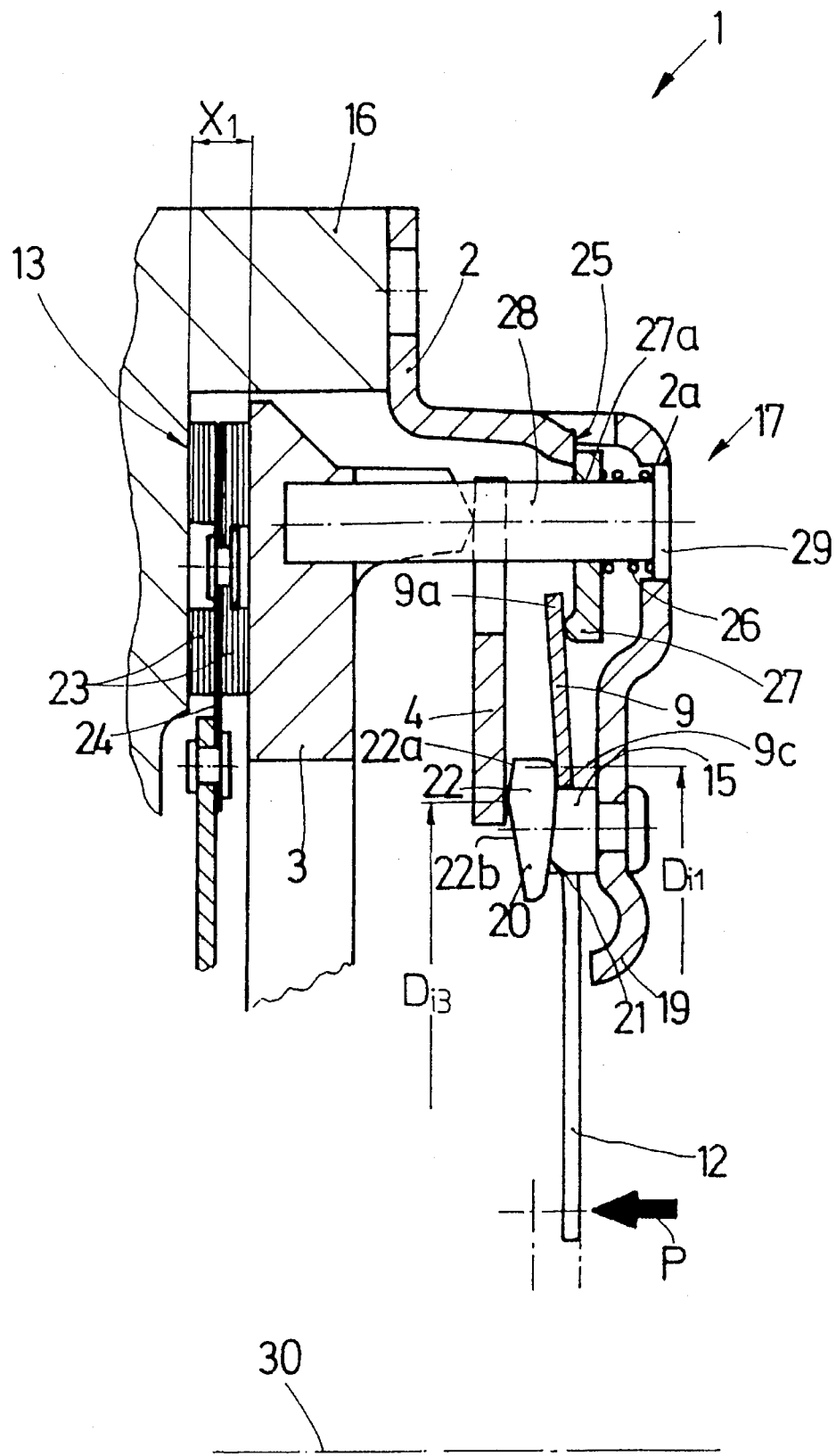

As shown in FIGS. 6 and 6a, the clutch housing 2 is preferably fastened to the counterthrust plate 16, which counterthrust plate 16 is preferably in the form of a flywheel. Between two friction surfaces axially opposite one another of the counterthrust plate 16 and the thrust plate 3, there preferably is a clutch disc 13 with spring segments 24 and friction linings 23. The thrust plate 3 is preferably non-rotationally but axially movably mounted in the clutch housing 2. The mounting of the thrust plate 3 in the housing 2 can be accomplished, for example, by means of tangential leaf springs (not shown), such a mounting is well known in the art and will not be discussed further here.

The thrust plate 3 is preferably pushed by means of a cup spring 4 toward the counterthrust plate 16, whereby the cup spring 4 can preferably be supported near its outside diameter on the thrust plate 3, and with its inside diameter on the heads 20 of spacer bolts 15. The spacer bolts 15 are preferably fastened concentrically about the axis of rotation 30 in the clutch housing 2. To support the cup spring 4, the heads 20 preferably have bearing areas 22, which bearing areas 22 preferably extend in the direction of the thrust plate 3. In accordance with at least one embodiment of the present invention, there can preferably be angled surfaces 22a and 22b (see FIG. 6a) immediately adjacent the bearing areas 22. The cup springs 4 are preferably in contact with the bearing areas 22 primarily due to prestress applied from the direction of the thrust plate 3. The heads 20 of the spacer bolts 15 can also preferably have a contour 21, which contour 21 preferably faces away from the thrust plate 3, which contour can preferably serve as a bearing surface for the clutch release element 9.

The clutch release element 9 is preferably located between the clutch housing 2 and the heads 20 of the spacer bolts 15, whereby the spacer bolts 15 preferably extend through corresponding openings 9c (see FIG. 6a) in the clutch release element 9. The clutch release element 9 preferably extends radially inward by means of flexible tongues 12 to a clutch release system. The clutch release system is not shown but is well known in the art and will not be further described here. The flexible tongues 12 preferably extend radially inward to an actuation device (described in further detail herebelow) for actuating the thrust plate 3. The bearing diameter for the cup spring 4 is designated Di3, and the bearing diameter between the clutch release element 9 and the contour 21 is designated Di1. The actuation device for the thrust plate 3 can generally include several bolts 28, which bolts 28 are preferably located concentrically about the axis of rotation 30. The bolts 28 preferably extend in a direction parallel to the axis of rotation 30, and also preferably extend axially toward the clutch housing 2. In the present embodiment, the bolts 28, in their terminal areas with their heads 29, preferably extend through corresponding openings 2a (see FIG. 6a) in the clutch housing 2. On these bolts 28, levers 27 are preferably mounted to permit axial movement, which levers 27 can preferably transmit the release force from the release element 9 by tilting the levers 27 to engage the levers 27 with the bolts 28, and then moving the bolts 28. For this purpose, openings 27a in the levers 27 are preferably designed so that the openings 27a preferably approximately correspond to the diameter of the bolts 28.

In the engaged position shown in FIGS. 6 and 6a, the clutch release element 9 is preferably in contact with the individual levers 27 with a slight prestress, so that the levers 27 are preferably clamped in relation to the corresponding bolt 28 and simultaneously, each of the levers 27, at an end opposite the contact with the clutch release element 9, is preferably in contact with a housing stop 25, which housing stop 25 is preferably rigidly fastened to the housing 2. There can also be a spring 26 between the head 29 of each bolt and the corresponding lever 27, which spring 26 essentially provides a constant slight pressure on the lever 27, preferably in the direction of the thrust plate 3.

The basic operation of the friction clutch 1 illustrated in FIGS. 6 and 6a preferably is as follows:

The thrust force for the frictional clamping of the clutch disc 13 is preferably applied by the cup spring 4. The cup spring 4 can preferably be supported on one hand on the heads 20 of the spacer bolts 15, and thus on the clutch housing 2, and on the other hand directly on the thrust plate 3. The spring force curve of such a cup spring 4 can be designed so that the curve is very flat over essentially the entire actuation distance and also over essentially the entire wear distance, as shown for example in FIG. 3 and in FIG. 9, which will be explained in further detail below. The clutch release element 9 can preferably be used to actuate or disengage the friction clutch 1. By means of a clutch release system (not shown) and a clutch release bearing (not shown), both of which are well known in the art and will not be discussed further here, a force P can be applied to the ends of the flexible tongues 12, preferably in the direction of the thrust plate 3. The release element 9 can thereby preferably be tilted about the head 20 of bolts 15 around a middle diameter Di1, so that the radially outer portion 9a (see FIG. 6a) of the release element 9 preferably exerts a releasing force, by means of the lever 27 preferably clamped about the bolts 28, on the thrust plate 3. The outside diameter, or the radially outer portion 9a, of the release element 9 thus executes an axial movement together with the levers 27, the bolts 28 and the thrust plate 3, preferably away from the clutch disc 13 and opposite to the direction of the arrow P. Thus, the friction clutch 1 is put into a released state and the clutch disc 13 is preferably free.

The engagement process of the friction clutch 1 can preferably take place in the opposite direction of that described immediately above. In that case, the release element 9 can preferably be designed similar to a membrane spring, and can itself preferably exert a spring force on the parts with which it is in contact. This spring force of the release element 9 is defined so that in the engaged state illustrated in FIGS. 6 and 6a, the release element 9 preferably exerts a slight releasing force on the thrust plate 3, so that the release element 9, during operation of the engaged friction clutch, is preferably held in essentially continuous contact with the levers 27 on one hand, and with the heads 20 of the spacer bolts 15 on the other hand. The release element 9 can also be designed so that with an increasing release distance, possibly due to wear of the friction linings 23, the release element 9 applies a greater releasing force, and thus can partly compensate for the force exerted by the cup spring 4. In this manner, the required actuation force for the friction clutch 1 can be significantly reduced.

Further, when the clutch pedal is depressed by the operator of the motor vehicle, the spring 26 is preferably compressed more and more, thus exerting more force on the release element 9, so that much force is needed to hold the clutch in a disengaged position. This type of characteristic could possibly be advantageous in a high performance car, such as a race car, where a more rapid engagement of the clutch is desirable.

The wear compensation device 17 illustrated in FIGS. 6 and 6a can preferably operate as follows:

In the engaged state illustrated in FIGS. 6 and 6a, and when the friction clutch 1 is new, each lever 27 is preferably brought into contact with the housing stop 25. This can be done, for example, by means of the spring 26, if the clutch release element 9 is released briefly from its contact with the lever 27. If the levers 27 are in the illustrated position, the clutch release element 9 preferably exerts a low releasing force, so that the levers 27, with their openings 27a, are preferably tipped in relation to the bolts 28 to thereby become essentially clamped to the bolts 28, so that the levers 27 can thus transmit a releasing force to the bolts 28, and thus to the thrust plate 3. If, during a startup, there is wear to the friction linings 23, then the next time the friction clutch 1 is engaged, each of the levers 27 will typically come into premature contact with the housing stop 25, although the thrust plate 3 has not yet clamped the friction linings 23. The dimension $X_1$ illustrated in FIGS. 6 and 6a has essentially become smaller, due to wear of the friction linings 23. The force of the cup spring 4 will essentially quarantee that the levers 27 come into contact with the housing stop 25, then upon further movement of the thrust plate 3 toward the linings 23, the levers 27 will essentially no longer be in a tilted configuration about bolts 28, and the clamping force between the levers 27 and the bolts 28 would be briefly eliminated. At this point, the thrust plate 3 can preferably clamp the friction linings 23, and the relative position between the bolts 28 and the levers 27 can be changed by the extent of the wear. It can thereby be essentially guaranteed that during the disengagement of the thrust plate 3, as the wear of the friction linings 3 increases, the levers 27 will preferably retain their position in relation to the clutch housing 2, whereupon the position of the clutch release element 9 is also preferably retained inside the clutch housing 2. Thus, the originally defined spring force which is preferably exerted by the release element 9 on the clutch 1 can also be retained, so that the reduction of the clutch release force essentially FIG. 9 will be discussed now with regard to its relevance to FIGS. 6 and 6a. FIG. 9 shows the spring forces as a function of the clutch release distance. The engaged state of the friction clutch 1, as illustrated in FIGS. 6 and 6a, corresponds essentially to the release distance 0. The spring characteristic H is preferably generated by the cup spring 4, and is practically constant over great distances. The spring characteristic G preferably corresponds to the clutch release element 9. At the release distance 0, the spring characteristic G preferably crosses zero, although the fine tuning can essentially guarantee that, in the engaged state of the friction clutch 1, there is essentially always a low releasing force, i.e. the curve is preferably in the positive force range. The slope of the spring characteristic G results from the fact that the greatest possible disengagement relief is to be achieved. The force of the characteristic G can be subtracted from the characteristic H of the cup spring 4, and the resulting characteristic I is preferably formed.

It should be understood that in the vast majority of cases, the clutch discs 13 are typically equipped with spring segments 24 between the friction linings 23, so the spring characteristic K should also be included in the considerations. The characteristic K shows the curve of the spring forces of the spring segments 24, preferably in the range between the disengagement distance 0 (which corresponds to the engaged state) and the disengaged state, which corresponds to disengagement distance 1'. In the disengaged state, the clutch disc is typically free of any pressure from the thrust plate 3. If the characteristic K is subtracted from the resulting characteristic I, the result is a disengagement force curve preferably corresponding to the resultant L. Curve L shows that at the disengagement distance 0, the curve preferably starts with the disengagement force 0, then ascends corresponding to the tuning specified here to approximately one-half of the force of the cup spring 4 corresponding to the characteristic H, and then descends again. The descending branch of curve L preferably corresponds to the resultant I which, starting from the disengagement distance 1', descends to 0 toward disengagement distance 2'. Such a decrease to the value 0 within the normal disengagement distance is typically undesirable, since the danger can exist that the disengagement system remains stationary in this position on account of friction, and for example, the clutch pedal cannot return by itself into the starting position. For this reason, a curve of the resultant L is desirable as shown in the dotted portion corresponding to $L_1$.

The curve as shown by $L_1$ can easily be achieved by means of the measures described below. FIGS. 6, 6a, 7, and 8 illustrate these measures. The heads 20 of the spacer bolts 15 can preferably be provided with a contour 21, on the side of contact with the clutch release element 9, which contour can preferably cause a rolling of the clutch release element 9 over the clutch release distance, whereby the bearing area 22 realized in the engaged state corresponding to the diameter Di1 shown in FIGS. 6 and 6a, preferably makes the transition into a bearing area diameter Di2 shown in FIG. 7. Diameter Di2 is preferably significantly less than diameter Di1, so that preferably by means of a change in the lever 27 translation, there is an intervention in the spring force curve of the clutch release element 9. This is illustrated in FIG. 9 by the dotted curve of the spring characteristic G1 or by the resultant $L_1$. The tuning in the present case can preferably be designed so that approximately after the elimination of the frictional clamping of the clutch disc, when the spring segments 24 are relieved, the change in diameter of the contact between the disengagement element 9 and the contour 21 preferably changes in the direction Di2, so that starting at the clutch release distance 1, the resultant L does not follow the curve of the resultant I, but preferably takes the path $L_1$. The change in translation over the contour 21 can be different, if the slope of the spring characteristic G is selected so that it is flatter, for example, and under some conditions the change in translation can even be eliminated. With a flatter characteristic G, however, there is preferably a lower reduction of the clutch release forces.

Figure 7:
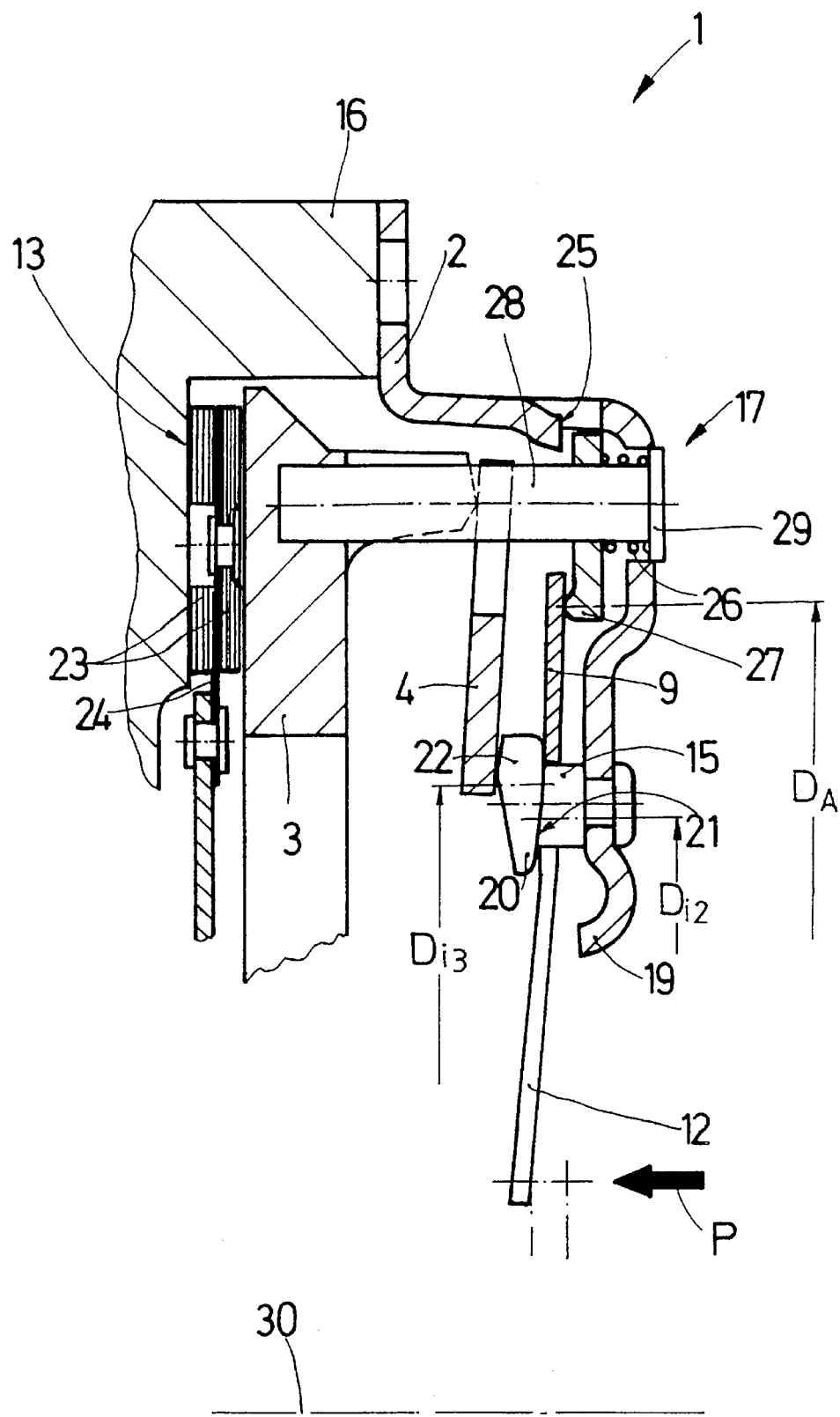

Hardly any additional comments are necessary with regard to FIG. 7, since FIG. 7 essentially shows the disengaged position of the friction clutch 1 shown in FIGS. 6 and 6a. FIG. 7 shows that the lever 27, and the extent of disengagement, are relatively far from the corresponding housing stop 25.

FIG. 8 shows the effect of the wear to the friction linings 23, in relation to FIGS. 6 and 6a. FIGS. 6 and 6a show a clutch disc on which, when the clutch is engaged and thus when the spring segments 24 are compressed, the friction linings 24 are preferably at a distance $X_1$, $X_1$ representing the distance between the counterthrust plate 16 and the thrust plate 3. In FIG. 8, distance $X_1$ is reduced by wear to the lower value $X_2$. With reference to the description of the wear compensation device 17 given hereinabove, the thrust plate 3 with the bolts 28, preferably move by an amount Y, wherein Y approximately corresponds to the difference between $X_1$ and $X_2$, in a direction preferably towards the counterthrust plate 16. The adjustment device 17 can then essentially guarantee that the levers 27 remain in their position in relation to the clutch housing 2, preferably due to the housing stops 25, among other things, so that the position of the clutch release element 9 can essentially remain the same, or constant even with wear of the friction linings 23. The correspondence between the characteristic curves of the clutch release element 9 and of the spring segments 24 thus remains essentially constant. The same is also true for the diameter relationships shown in FIG. 7, with regard to the rolling of the clutch release element 9 on the contour 21.

Figure 5:
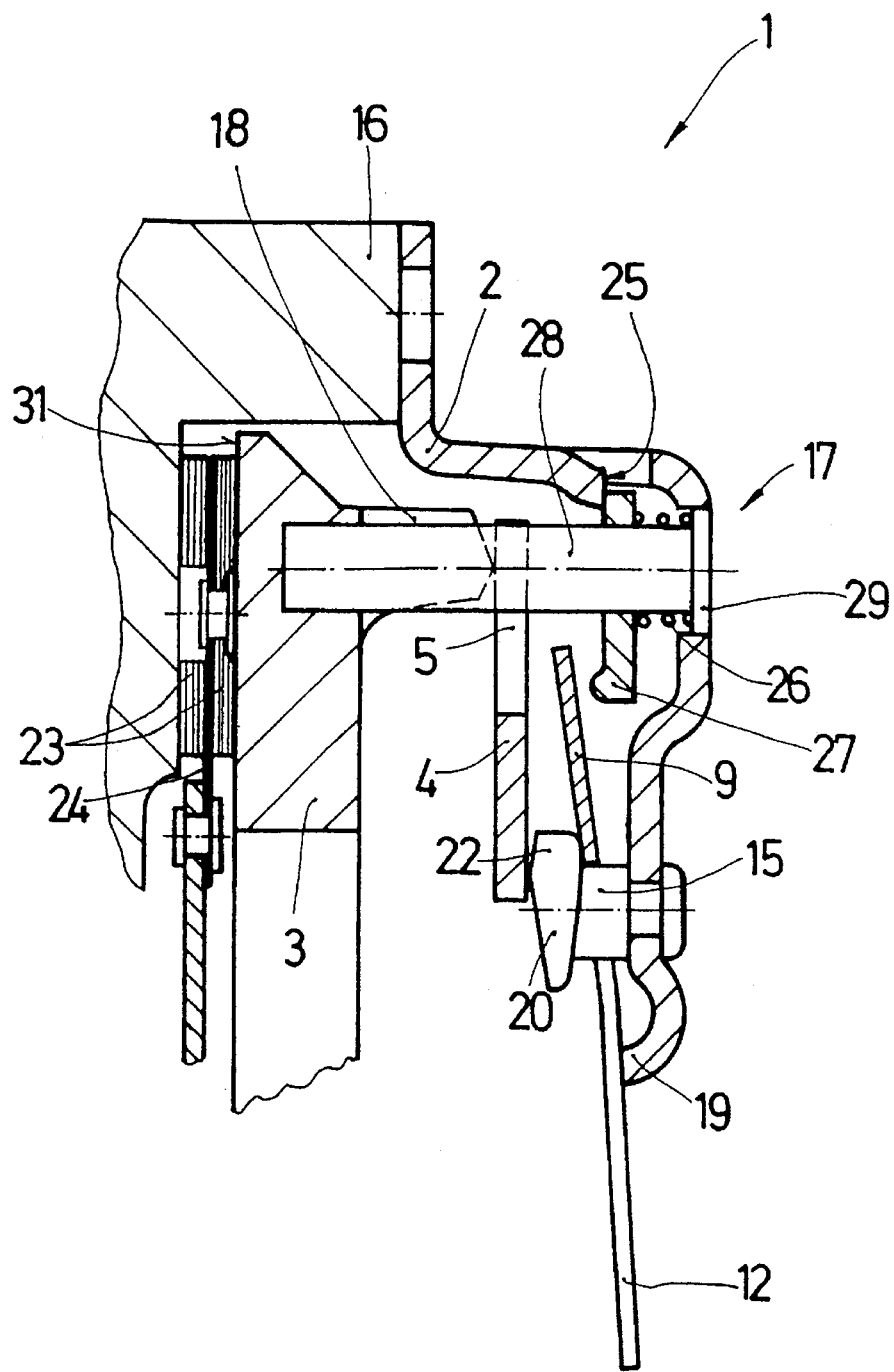

FIG. 5, an explanation of which has been postponed until this point, shows the clutch pressure plate 3 preferably after the installation and, for example, during storage or shipment of the friction clutch 1. The clutch release element 9 is preferably in a position corresponding to the curve of spring characteristic G in the negative force range. That essentially means that the release element 9 preferably accumulates a residual stress in the engagement direction opposite to the functional position of the release element 9, and thereby preferably does not come into contact with the levers 27. The clutch release element 9 is preferably held in this position by stops 19 of the clutch housing 2, which stops 19 are preferably located radially inside the spacer bolts 15. The pressure plate 3 is thus in a stable position and the spring 26 of the wear compensation device 17 can preferably move the levers 27 into their base position even with a low spring force, which corresponds to contact with the housing stops 25.

During the installation of the pressure plate 3, against the thrust plate 16 and clutch disc 13 and in connection with the first actuation of the friction clutch 1, the clutch release element 9 preferably moves into the operating position and is preferably held in this position, because the clutch release element 9 is fixed, at least to a slight extent, on that side of its zero crossing position as illustrated in FIG. 9. Thus, the clutch release element 9 can preferably exert a releasing force, albeit a slight releasing force, by means of the levers 27 and the bolts 28 on the thrust plate 3.

It should be understood that all of the embodiments of the present invention can preferably have a clutch release element 9 which preferably has the configuration illustrated in FIGS. 2 and 2a. Further, the clutch release element 9, in accordance with at least one embodiment of the present invention, the thickness of the clutch release element 9, and the thickness of the tongues 12, can preferably be about 0.4 cm, however, the thickness of the release element 9, and of the tongues 12 can alternatively be about 0.1 cm, 0.11 cm, 0.12 cm, 0.13 cm, 0.14 cm, 0.15 cm, 0.16 cm, 0.17 cm, 0.18 cm, 0.19 cm, 0.2 cm, 0.21 cm, 0.22 cm, 0.23 cm, 0.24 cm, 0.25 cm, 0.26 cm, 0.27 cm, 0.28 cm, 0.29 cm, 0.3 cm, 0.31 cm, 0.32 cm, 0.33 cm, 0.34 cm, 0.35 cm, 0.36 cm, 0.37 cm, 0.38 cm, 0.39 cm, 0.41 cm, 0.42 cm, 0.43 cm, 0.44 cm, 0.45 cm, 0.46 cm, 0.47 cm, 0.48 cm, 0.49 cm, 0.5 cm, 0.51 cm, 0.52 cm, 0.53 cm, 0.54 cm, 0.55 cm, 0.56 cm, 0.57 cm, 0.58 cm, 0.59 cm, 0.6 cm, 0.61 cm, 0.62 cm, 0.63 cm, 0.64 cm, 0.65 cm, 0.66 cm, 0.67 cm, 0.68 cm, 0.69 cm, 0.7 cm, 0.71 cm, 0.72 cm, 0.73 cm, 0.74 cm, 0.75 cm, 0.76 cm, 0.77 cm, 0.78 cm, 0.79 cm, 0.8 cm, 0.81 cm, 0.82 cm, 0.83 cm, 0.84 cm, 0.85 cm, 0.86 cm, 0.87 cm, 0.88 cm, 0.89 cm, 0.9 cm, 0.91 cm, 0.92 cm, 0.93 cm, 0.94 cm, 0.95 cm, 0.96 cm, 0.97 cm, 0.98 cm, 0.99 cm, or 1.0 cm.

The thickness of the cup spring 4, in accordance with at least one embodiment of the present invention, can preferably have a thickness of about 0.6 cm, however, the thickness of the cup spring 4, can alternatively be about 0.1 cm, 0.11 cm, 0.12 cm, 0.13 cm, 0.14 cm, 0.15 cm, 0.16 cm, 0.17 cm, 0.18 cm, 0.19 cm, 0.2 cm, 0.21 cm, 0.22 cm, 0.23 cm, 0.24 cm, 0.25 cm, 0.26 cm, 0.27 cm, 0.28 cm, 0.29 cm, 0.3 cm, 0.31 cm, 0.32 cm, 0.33 cm, 0.34 cm, 0.35 cm, 0.36 cm, 0.37 cm, 0.38 cm, 0.39 cm, 0.4 cm, 0.41 cm, 0.42 cm, 0.43 cm, 0.44 cm, 0.45 cm, 0.46 cm, 0.47 cm, 0.48 cm, 0.49 cm, 0.5 cm, 0.51 cm, 0.52 cm, 0.53 cm, 0.54 cm, 0.55 cm, 0.56 cm, 0.57 cm, 0.58 cm, 0.59 cm, 0.61 cm, 0.62 cm, 0.63 cm, 0.64 cm, 0.65 cm, 0.66 cm, 0.67 0.68 cm, 0.69 cm, 0.7 cm, 0.71 cm, 0.72 cm, 0.73 cm, 0.74 cm, 0.75 cm, 0.76 cm, 0.77 cm, 0.78 cm, 0.79 cm, 0.8 cm, 0.81 cm, 0.82 cm, 0.83 cm, 0.84 cm, 0.85 cm, 0.86 cm, 0.87 cm, 0.88 cm, 0.89 cm, 0.9 cm, 0.91 cm, 0.92 cm, 0.93 cm, 0.94 cm, 0.95 cm, 0.96 cm, 0.97 cm, 0.98 cm, 0.99 cm, 1.0 cm, 1.1 cm, 1.2 cm, 1.3 cm, 1.4 cm, or 1.5 cm.

The release element 9 and the cup spring 4, in accordance with at least one embodiment of the present invention, can typically be made from steel, or another suitable material, which would retain its properties at high speeds and or high temperatures.

In accordance with at least one embodiment of the present invention, the length of the tongues 12, taken from point A to point B shown in FIG. 2a, can preferably be about 8.5 cm. Alternatively, the length of tongues 12 can preferably be 3.2 cm, 3.4 cm, 3.6 cm, 3.8 cm, 4.2 cm, 4.4 cm, 4.6 cm, 4.8 cm, 5.0 cm, 5.2 cm, 5.4 cm, 5.6 cm, 5.8 cm, 6.0 cm, 6.2 cm, 6.4 cm, 6.6 cm, 6.8 cm, 7.0 cm, 7.2 cm, 7.4 cm, 7.6 cm, 7.8 cm, 8.0 cm, 8.2 cm, 8.4 cm, 8.6 cm, 8.8 cm, 9.0 cm, 9.2 cm, 9.4 cm, 9.6 cm, 9.8 cm, or 10.0 cm.

The thickness of the clutch release element 9, thickness of the cup spring 4, and the length of the tongues 12 are not to be taken as limited to the above-mentioned dimensions.

FIG. 10 shows what could be considered to be a typical motor vehicle 100, which motor vehicle 100 typically includes an internal combustion engine 101, preferably mounted in the forward portion thereof. The motor vehicle could also typically be include a transmission 102 for transmission of mechanical power from the engine 101 to the wheels. If the motor vehicle 100 has a manual transmission 102, the friction clutch 1, in accordance with the embodiments of the present invention may also be included, for engaging the transmission 102 with the engine 101.

One feature of the invention resides broadly in the friction clutch, in particular for motor vehicles, comprising a thrust plate mounted in a housing so that it cannot rotate but can move axially, and which is pressed by the force of a cup spring with the interposition of a clutch disc with friction linings toward a counterthrust plate, and the housing is fastened to the counterthrust plate, whereby the cup spring presses with its uninterrupted outside diameter against the thrust plate and is in contact with its inside diameter interrupted by notches on the housing, a clutch release mechanism to release the thrust plate against the force of the cup spring, characterized by the fact that located in the housing 2 there are spacer bolts 6 on a middle diameter, which extend toward the thrust plate 3, the cup spring 4 with its notches 5 surrounds the spacer bolts 6, between the cup spring 4 and thrust plate 3 there is a clutch release element 9, which is realized approximately in the shape of a membrane spring, which is in contact with its outside diameter on the thrust plate, with openings 1 for the passage of the spacer bolts 6 and with flexible tongues 12 running radially inward, and which is axially braced on the spacer bolt heads 7, whereby cup springs 4 and clutch release elements 9 have essentially the same outside diameter, and there is a spacer or direct contact element wire ring 13 located between them.

Another feature of the invention resides broadly in the friction clutch characterized by the fact that the clutch release element 9, starting from the outside diameter, has slots 11 which run radially inward, which are offset circumferentially from the openings 10 for the passage of the spacer bolts 6 and extend at least to the latter.

Yet another feature of the invention resides broadly in the friction clutch characterized by the fact that the clutch release element 9 is provided with a slight axial prestress, and that contact with the spacer bolt heads 7 is guaranteed when the clutch is engaged.

Still another feature of the invention resides broadly in the friction clutch characterized by the fact that the prestress is designed so that it is approximately eliminated when the friction clutch 1 is disengaged.

A further feature of the invention resides broadly in the friction clutch, in particular for motor vehicles, comprising a thrust plate mounted in a housing so that it cannot rotate but can move axially, and which is pressed by the force of a cup spring with the interposition of a clutch disc with friction linings toward a counterthrust plate and the housing is fastened to the counterthrust plate, whereby the cup spring presses against the thrust plate with its outside diameter and is in contact with its inside diameter on the housing, a clutch release mechanism to release the thrust plate against the force of the cup spring, characterized by the fact that the clutch release mechanism has a clutch release element 9 which is designed in the form of a component similar to a membrane spring, which is supported by means of a middle diameter by means of spacer bolts 6 on the housing 2, by means of its outside diameter on the thrust plate 3, and is provided radially inward with flexible tongues 12, whereby the clutch release element 9, when the friction clutch is engaged, exerts only a slight releasing force, and with increasing movement toward a disengaged clutch there is a decrease of the releasing force to a value of approximately 0.

Another feature of the invention resides broadly in the friction clutch characterized by the fact that the clutch release element 9 interacts with a wear compensation device 17 which, if there is wear of the friction linings, influences the releasing force curve either insignificantly or not at all.

Yet another feature of the invention resides broadly in the friction clutch characterized by the fact that between the outside diameter of the clutch release element 9 and the thrust plate 3, there is a wear compensation device 17 which, when there is wear of the friction linings of the clutch disc, changes the relationship between the thrust plate and the clutch release element so that the position of the clutch release element 9 remains unchanged, regardless of the wear state of the friction lining.

Still another feature of the invention resides broadly in the friction clutch, in particular for motor vehicles, comprising a clutch housing which is fastened to a counterthrust plate and defines an axis of rotation, a thrust plate mounted in the clutch housing and guided so that it cannot rotate but can be moved axially and has a friction surface to clamp a clutch disc between the thrust plate and the counterthrust plate, a cup spring between the thrust plate and the clutch housing to generate the clamping force for the clutch disc, a clutch release mechanism to eliminate the clamping force and to release the thrust plate, characterized by the fact that the clutch release mechanism includes a clutch release element 9 which has a component similar to a membrane spring which is located and designed so that when the friction clutch 1 is engaged, it exerts a low releasing force, and there is an increase of the releasing force with an increasing movement in the direction of the disengagement of the clutch.

A further feature of the invention resides broadly in the friction clutch characterized by the fact that the clutch release element 9 interacts with a wear compensation device 17 which, when there is wear of the friction lining 23, influences the releasing force curve only insignificantly or not at all.

Another feature of the invention resides broadly in the friction clutch characterized by the fact that the wear compensation device 17 is located between the outside diameter of the clutch release element 9 and the thrust plate, and when there is wear to the friction linings 23, the relationship between the thrust plate 3 and the clutch release element 9 changes so that, regardless of the amount of wear to the friction lining 23, the installed position of the clutch release element 9 remains unchanged.

Yet another feature of the invention resides broadly in the friction clutch characterized by the fact that the clutch release element 9 has numerous openings distributed on the circumference on a concentric diameter, into which spacer bolts 15 fastened to the clutch housing 2 extend, and the clutch release element 9 is supported on one hand on the heads 20 of the spacer bolts 15 and on the other hand, in the vicinity of its outside diameter, on the thrust plate 3.

Still another feature of the invention resides broadly in the friction clutch characterized by the fact that the clutch release element 9, when the friction clutch 1 is engaged, exerts a defined low releasing force on the thrust plate 3, and therefore a secure, unilateral contact with the heads 20 of the spacer bolts 15 is guaranteed.

A further feature of the invention resides broadly in the friction clutch characterized by the fact that the cup spring 4 is supported on one side on the thrust plate 3 and on the other side on the heads 20 of the spacer bolts 15.

Another feature of the invention resides broadly in the friction clutch characterized by the fact that the spacer bolts 15 extend from the clutch housing 2 toward the thrust plate 3, and the clutch release element 9 is in contact on the side of the heads 20 facing the clutch housing 2, and the cup spring 4 is in contact on the side facing the thrust plate 3.

Yet another feature of the invention resides broadly in the friction clutch characterized by the fact that the cup spring 4 is in contact on its inside diameter with the spacer bolts 15 and on its outside diameter with the thrust plate 3.

Still another feature of the invention resides broadly in the friction clutch characterized by the fact that the thrust plate 3 has several bolts 28 distributed on the circumference, which run parallel to the axis of rotation 3 in the direction of the clutch housing 2, pointing away from the friction surface of the thrust plate 3, radially outside the clutch release element 9, each bolt 28 runs through a lever 27 which can be fixed on the bolt 28 by a clamping force, pressure is applied to each lever 27 in its terminal area pointing radially inward, radially inside the bolt 28, by the clutch release element 9 pointing away from the friction surface of the thrust plate 3, and is in contact with its terminal area pointing radially outward, radially outside the bolt 28, against a housing stop 25, and a spring 26 pushes each lever toward the thrust plate until it makes contact with the housing stop 25.

A further feature of the invention resides broadly in the friction clutch characterized by the fact that each head 20 of a spacer bolt 15, on the bearing area side for the release element 9, has a contour 21, which produces a radial shift of the support diameter during the clutch release process from the greater value $D_{i1}$ to the lesser value $D_{i2}$, and thus a change in translation in the sense of an increase of the clutch release force.

Another feature of the invention resides broadly in the friction clutch characterized by the fact that the clutch release element 9, when the thrust plate is in the position for installation or transport, is in a position in which it attempts to exert an engagement force on the thrust plate, whereby it comes into contact radially inside the spacer bolts 15 on stops 19 of the clutch housing 2 by means of residual stress.

Some examples of release assemblies for friction clutches, and some examples of friction clutches are disclosed in the following U.S. Patents: U.S. Pat. No. 4,201,282 to Ernst et al. on May 6, 1980, entitled "Clutch Release Assembly and Bearing Therefore"; U.S. Pat. No. 3,920,107 to Limbacher on Nov. 18, 1975, entitled "Self-Aligning Clutch Release Bearing Arrangement"; U.S. Pat. No. 4,781,050 to Link et al. on Oct. 3, 1989, entitled "Clutch Arrangement"; U.S. Pat. No. 4,542,813 to Schierling on Sep. 24, 1985, entitled "Frictional Clutch Assembly"; and U.S. Pat. No. 4,637,505 to Huber on Jan. 20, 1987, entitled "Fluid-operated Clutch Disengaging Apparatus".

Types of membrane springs which could be used in accordance with the embodiments of the present invention are disclosed in the following U.S. Patents: U.S. Pat. No. 5,240,227 to Sich on Aug. 31, 1993, entitled "Electromagnetically Operated Valve"; U.S. Pat. No. 4,890,815 to Hascher et al. on Jan. 2, 1990, entitled "Valve with Membrane Spring"; U.S. Pat. No. 4,535,816 to Feder et al. on Aug. 20, 1985, entitled "Pressure Controller"; U.S. Pat. No. 3,902,527 to Schwerin et al. on Sep. 2, 1975, entitled "Electromagnetically Actuatable Multipath Valve"; and U.S. Pat. No. 2,117,482 to Klix entitled "Clutch Lever Plate".

The appended drawings in their entirely, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

A membrane spring which may be utilized in accordance with the embodiments of the present invention is disclosed in German Laid Open Patent Application DE-OS 43 22 506. German Laid Open Patent Application DE-OS 43 22 506, as well as its published equivalent are hereby incorporated by reference as if set for in their entirety herein.

The corresponding foreign patent publication applications, namely, Federal Republic of Germany Patent Application Nos. P 44 12 106.7, filed on Apr. 8, 1994 and P 43 23 857.2, filed on Jul. 16, 1993, having inventor Reinhold WEIDINGER, and DE-OS P 44 12 106.7 and P 43 23 857.2 and DE-PS P 44 12 106.7 and P 43 23 857.2, as well as their published equivalents are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a motor vehicle, said friction clutch comprising:

a clutch disc having an axis of rotation and defining an axial direction parallel to said axis of rotation;

a pressure plate;

a housing;

said pressure plate having means for being mounted for axial movement in said housing with respect to said clutch disc, said means for being mounted permitting movement of said pressure plate between an engaged position in which said pressure plate makes substantial contact with said clutch disc, and a disengaged position in which said pressure plate is out of substantial contact with said clutch disc;

first spring means for biasing said pressure plate towards said clutch disc, said first spring means comprising a cup spring having an outermost diameter disposed maximally from said axis of rotation and an innermost diameter disposed minimally from said axis of rotation;

said cup spring being disposed within said housing;

second spring means for permitting said pressure plate to move away from said clutch disc, said second spring means comprising a membrane spring having an outermost diameter disposed maximally from said axis of rotation and an innermost diameter disposed minimally from said axis of rotation;

said membrane spring being disposed within said housing;

said membrane spring comprising a plurality of tongues extending radially inward towards said axis of rotation;

each of said plurality of tongues having means for accepting a force in a direction towards said pressure plate to permit said pressure plate to move away from said clutch disc into said disengaged position;

means for supporting said cup spring and said membrane spring with respect to said housing;

said membrane spring being disposed between said pressure plate and said cup spring;

means for maintaining said cup spring and said membrane spring in a spaced-apart relationship with one another, said means for maintaining being disposed between said cup spring and said membrane spring;

said outermost diameter of said cup spring being generally equal to said outermost diameter of said membrane spring; and said innermost diameter of said cup spring being substantially greater than said innermost diameter of said membrane spring.

2. The friction clutch according to claim 1 wherein said cup spring and said membrane spring each comprise means for receiving said supporting means, said supporting means being disposed in said receiving means of said cup spring and in said receiving means of said membrane spring.

3. The friction clutch according to claim 2 wherein:

said receiving means of said membrane spring comprises a plurality of openings disposed within said membrane spring, said plurality of openings being disposed at substantially the same radius with respect to said axis of rotation;

said plurality of openings are disposed at substantially equal intervals along said membrane spring;

said membrane spring further comprises a plurality of slots extending radially inwardly from said outermost diameter of said membrane spring and towards said innermost diameter of said membrane spring, each of said plurality of slots having a terminal end portion disposed a substantial radial distance from said outermost diameter of said membrane spring; and said terminal end portions and said plurality of openings are disposed in a spaced-apart relationship with respect to one another and at substantially the same radial distance with respect to said innermost diameter of said membrane spring.

4. The friction clutch according to claim 3 wherein:

said plurality of openings and said plurality of slots are disposed adjacent said outermost diameter of said membrane spring; and said plurality of openings and said plurality of slots are disposed in an alternating fashion with respect to one another in a circumferential direction along said membrane spring.

5. The friction clutch according to claim 4 wherein:

each of said plurality of tongues extend substantially from two adjacent ones of said plurality of openings to said innermost diameter of said membrane spring; and each of said terminal end portions of said plurality of slots are disposed in at least a portion of a corresponding one of said plurality of tongues.

6. The friction clutch according to claim 5 wherein:

said supporting means comprises a plurality of spacer bolts, each one of said plurality of spacer bolts having a bolt head disposed adjacent said pressure plate;

said friction clutch further comprises a ring disposed between said membrane spring and said plurality of bolt heads, said ring having a substantially circular cross-section for permitting said membrane spring to pivot with respect to said plurality of bolt heads; and said membrane spring is configured for receiving an axial prestress upon installation such that said membrane spring maintains contact with said plurality of bolt heads, by means of said ring, in said engaged position of said pressure plate, the prestress being substantially eliminate in said disengaged position of said pressure plate.

7. The friction clutch according to claim 6 wherein:

said outermost diameter of said cup spring and said outermost diameter of said membrane spring are the same;

said pressure plate has an axially projecting portion extending from said pressure plate towards said housing;

said outermost diameter of said membrane spring makes contact with said projecting portion of said pressure plate;

said ring is a first ring;

said means for maintaining comprises a second ring disposed between said outermost diameter of said cup spring and said outermost diameter of said membrane spring;

said cup spring comprises a plurality of notches disposed at said innermost diameter of said cup spring, said plurality of notches for supporting said cup spring with respect to said housing;

said housing comprises a plurality of projecting portions disposed immediately adjacent and making contact with said plurality of spacer bolts, said plurality of projecting portions of said housing additionally making contact with said plurality of notches of said cup spring;

said plurality of spacer bolts extend substantially axially from said housing towards said pressure plate;

said receiving means of said cup spring comprises at least one opening;

said clutch disc comprises:
a first side facing said pressure plate and a second side opposite said first side;
friction linings disposed on said first side of said clutch disc and said second side of said clutch disc;

said friction clutch further comprises a counterthrust plate disposed adjacent said clutch disc, said counterthrust plate contacting said clutch disc in said engaged position of said pressure plate;

said housing is non-rotatably attached to said counterpressure plate;

said outermost diameter of said cup spring is substantially continuous;

said housing has an outermost diameter disposed maximally from said axis of rotation and an innermost diameter disposed minimally from said axis of rotation;

said housing comprises a plurality of openings, each one of said plurality of spacer bolts being disposed in a corresponding one of said plurality of openings of said housing; and said plurality of openings of said housing are disposed in said housing about mid-way between said innermost diameter of said housing and said outermost diameter of said housing.

8. The friction clutch according to claim 6 wherein:

said membrane spring comprises means for exerting a force on said pressure plate to urge said pressure plate to move in a direction away from said clutch disc in said engaged position of said pressure plate, said means for exerting a force on said pressure plate exerting a decreasing force on said pressure plate as said pressure plate moves from said engaged position to said disengaged position, the decreasing force exerted by said means for exerting decreasing to a value of about zero in said disengaged position of said pressure plate;

said pressure plate has an outermost diameter disposed maximally from said axis of rotation and an innermost diameter disposed minimally from said axis of rotation;

said pressure plate comprises:
a flanged portion extending substantially axially from said outermost diameter of said pressure plate towards said housing;

said flanged portion comprises an inner axial surface and an outer axial surface facing away from one another;

said flanged portion further comprises a terminal portion disposed adjacent said housing, said terminal portion contacting said outermost diameter of said cup spring;

said clutch disc comprises:
a first side facing said pressure plate and a second side opposite said first side;
friction linings disposed on said first side of said clutch disc and said second side of said clutch disc;

said cup spring comprises a plurality of notches disposed at said innermost diameter of said cup spring means, said plurality of notches for supporting said cup spring means with respect to said housing;

said housing comprises a plurality of projecting portions disposed immediately adjacent and making contact with said plurality of spacer bolts, said plurality of projecting portions of said housing additionally making contact with said plurality of notches of said cup spring;

said plurality of spacer bolts extend substantially axially from said housing towards said pressure plate;

said receiving means of said cup spring comprises at least one opening;

said membrane spring comprises an angled portion extending substantially between said ring and said flanged portion, said angled portion being angled towards said pressure plate;

said friction clutch further comprises a counterthrust plate disposed adjacent said clutch disc, said counterthrust plate contacting said clutch disc in said engaged position of said pressure plate;

said housing is non-rotatably attached to said counterpressure plate;

said outermost diameter of said cup spring is substantially continuous;

said housing has an outermost diameter disposed maximally from said axis of rotation and an innermost diameter disposed minimally from said axis of rotation;

said housing comprises a plurality of openings, each one of said plurality of spacer bolts being disposed in a corresponding one of said plurality of openings of said housing; and said plurality of openings of said housing are disposed in said housing about mid-way between said innermost diameter of said housing and said outermost diameter of said housing.

9. A friction clutch for a motor vehicle, said friction clutch comprising:

a clutch disc having an axis of rotation and defining an axial direction parallel to said axis of rotation;

a pressure plate;

a housing;

said pressure plate having means for being mounted for axial movement in said housing with respect to said clutch disc;

first spring means disposed within said housing for biasing said pressure plate towards said clutch disc;

second spring means disposed within said housing for permitting said pressure plate to move away from said clutch disc;

means for supporting said first spring means and said second spring means with respect to said housing;

said pressure plate being movable between an engaged position, in which said pressure plate makes substantial contact with said clutch disc, and a disengaged position in which said pressure plate is out of substantial contact with said clutch disc; and said second spring means comprising means for exerting a force on said pressure plate to urge said pressure plate to move in a direction away from said clutch disc in said engaged position of said pressure plate, said means for exerting a force on said pressure plate of said second spring means exerting a decreasing force on said pressure plate as said pressure plate moves from said engaged position to said disengaged position.

10. The friction clutch according to claim 9 wherein:

said first spring means comprises a cup spring having an outermost diameter disposed maximally from said axis of rotation and an innermost diameter disposed minimally from said axis of rotation;

said means for exerting a force on said pressure plate of said second spring means comprises a membrane spring having an outermost diameter disposed maximally from said axis of rotation and an innermost diameter disposed minimally from said axis of rotation, said innermost diameter of said cup spring being substantially greater than said innermost diameter of said membrane spring;

said membrane spring is disposed between said pressure plate and said cup spring, said membrane spring having a plurality of tongues extending radially inward towards said axis of rotation; and each of said plurality of tongues comprises means for accepting a force in a direction towards said pressure plate to permit said pressure plate to move away from said clutch disc into said disengaged position.

11. The friction clutch according to claim 10 wherein said friction clutch further comprises means for compensating for wear of said clutch disc.

12. The friction clutch according to claim 11 wherein said pressure plate has an outermost diameter disposed maximally from said axis of rotation and an innermost diameter disposed minimally from said axis of rotation, said means for compensating for wear being disposed between said outermost diameter of said membrane spring and said outermost diameter of said cup spring.

13. The friction clutch according to claim 12 wherein said means for compensating for wear is disposed adjacent said pressure plate and contacts said membrane spring.

14. The friction clutch according to claim 13 wherein:

said pressure plate comprises:
  a flanged portion extending substantially axially from said outermost diameter of said pressure plate towards said housing;
  said flanged portion comprises an inner axial surface and an outer axial surface facing away from one another, said means for compensating for wear being disposed adjacent said inner axial surface; and
  said flanged portion further comprises a terminal portion disposed adjacent said housing, said terminal portion contacting said outermost diameter of said cup spring.

15. The friction clutch according to claim 14 wherein:

said flanged portion is configured for maintaining said cup spring and said membrane spring in a spaced-apart relationship with one another;

said cup spring and said membrane spring each comprise means for receiving said supporting means, said supporting means being disposed in said receiving means of said cup spring and in said receiving means of said membrane spring;

said receiving means of said membrane spring comprises a plurality of openings disposed within said membrane spring, said plurality of openings being disposed at substantially the same radius with respect to said axis of rotation;

said plurality of openings are disposed at substantially equal intervals along said membrane spring;

said membrane spring further comprises a plurality of slots extending radially inwardly from said outermost diameter of said membrane spring and towards said innermost diameter of said membrane spring, each of said plurality of slots having a terminal end portion disposed a substantial radial distance from said outermost diameter of said membrane spring;

said terminal end portions and said plurality of openings are disposed in a spaced-apart relationship with respect to one another and at substantially the same radial distance with respect to said innermost diameter of said membrane spring;

said plurality of openings and said plurality of slots are disposed adjacent said outermost diameter of said membrane spring;

said plurality of openings and said plurality of slots are disposed in an alternating fashion with respect to one another in a circumferential direction about said membrane spring;

each of said plurality of tongues extend substantially from two adjacent ones of said plurality of openings to said innermost diameter of said membrane spring;

each of said terminal end portions of said plurality of slots are disposed in at least a portion of a corresponding one of said plurality of tongues;

said supporting means comprises a plurality of spacer bolts, each one of said plurality of spacer bolts having a bolt head disposed adjacent said pressure plate;

said friction clutch further comprises a ring disposed between said membrane spring and said plurality of bolt heads, said ring having a substantially circular cross-section for permitting said membrane spring to pivot with respect to said plurality of bolt heads;

said membrane spring is configured for receiving an axial prestress such that said membrane spring maintains contact with said plurality of bolt heads, by means of said ring, in said engaged position of said pressure plate, the prestress being substantially eliminated in said disengaged position of said pressure plate;

said clutch disc comprises:
  a first side facing said pressure plate and a second side opposite said first side;
  friction linings disposed on said first side of said clutch disc and said second side of said clutch disc;

said means for compensating compensates for wear of said friction linings of said clutch disc;

said cup spring comprises a plurality of notches disposed at said innermost diameter of said cup spring, said plurality of notches for supporting said cup spring with respect to said housing;

said housing comprises a plurality of projecting portions disposed immediately adjacent and making contact with said plurality of spacer bolts, said plurality of projecting portions of said housing additionally making contact with said plurality of notches of said cup spring;

said plurality of spacer bolts extend substantially axially from said housing towards said pressure plate;

said receiving means of said cup spring comprises at least one opening;

said membrane spring comprises an angled portion extending substantially between said first ring and said means for compensating for wear, said angled portion being angled towards said pressure plate;

said friction clutch further comprises a counterthrust plate disposed adjacent said clutch disc, said counterthrust plate contacting said clutch disc in said engaged position of said pressure plate;

said housing is non-rotatably attached to said counter-pressure plate;

said outermost diameter of said cup spring is substantially continuous;

said housing has an outermost diameter disposed maximally from said axis of rotation and an innermost diameter disposed minimally from said axis of rotation;

said housing comprises a plurality of openings, each one of said plurality of spacer bolts being disposed in a corresponding one of said plurality of openings of said housing;

said plurality of openings of said housing are disposed in said housing about mid-way between said innermost diameter of said housing and said outermost diameter of said housing; and the decreasing force exerted by said membrane spring on said pressure plate decreases to a value of about zero in said disengaged position of said pressure plate.

16. The friction clutch according to claim 11 wherein said means for compensating for wear of said clutch disc compensates for wear such that the decreasing force exerted by said membrane spring on said pressure plate is in a range as said pressure plate moves from said engaged position to said disengaged position, and said range is substantially constant during the life of said friction clutch regardless of wear to said clutch disc.

17. A friction clutch for a motor vehicle, said friction clutch comprising:

a clutch disc having an axis of rotation and defining an axial direction parallel to said axis of rotation;

a pressure plate;

a housing;

said pressure plate having means for being mounted for axial movement in said housing with respect to said clutch disc;

first spring means disposed within said housing for biasing said pressure plate towards said clutch disc;

second spring means disposed within said housing for biasing said pressure plate away from said clutch disc;

said pressure plate being movable between an engaged position, in which said pressure plate is in substantial contact with said clutch disc, and a disengaged position in which said pressure plate is out of substantial contact with said clutch disc; and said second spring means comprising means for exerting a force on said pressure plate to urge said pressure plate to move in a direction away from said clutch disc in said engaged position of said pressure plate, said means for exerting a force on said pressure plate of said second spring means exerting an increasing force on said pressure plate as said pressure plate moves from said engaged position to said disengaged position.

18. The friction clutch according to claim 17 wherein:

said second spring means is disposed between said housing and said first spring means; and said friction clutch further comprises means for supporting said first spring means and said second spring means with respect to said housing.

19. The friction clutch according to claim 18 wherein said friction clutch further comprises means for compensating for wear of said clutch disc such that the increasing force exerted by said means for exerting a force of said second spring means on said pressure plate is in a range as said pressure plate moves from said engaged position to said disengaged position, and said range is substantially constant during the operational life of said friction clutch regardless of wear to said clutch disc.

20. The friction clutch according to claim 19 wherein:

said second spring means comprises a membrane spring having an outermost diameter disposed maximally from said axis of rotation and an innermost diameter disposed minimally from said axis of rotation;

said means for compensating for wear comprises means for maintaining an installed position of said membrane spring with respect to said pressure plate, said means for maintaining intermittently operatively connecting said pressure plate and said membrane spring to one another.

21. The friction clutch according to claim 20 wherein:

said first spring means comprises a cup spring;

said means for supporting comprises a plurality of spacer bolts, each of said plurality of spacer bolts having a bolt head disposed between said cup spring and said membrane spring;

each one of said plurality of bolt heads has a first side disposed adjacent said cup spring and a second side disposed adjacent said membrane spring;

said cup spring contacts at least a portion of said first side of said plurality of bolt heads; and said membrane spring comprises said means for exerting a force on said pressure plate;

said membrane spring contacts at least a portion of said second side of said plurality of bolt heads, the force exerted by said membrane spring on said pressure plate urging said pressure plate to move away from said clutch disc in said engaged position of said pressure plate being of a sufficient magnitude such that said membrane spring maintains said contact with said at least a portion of said second side of said plurality of bolt heads.

22. The friction clutch according to claim 21 wherein:

said cup spring has an outermost diameter disposed maximally from said axis of rotation and an innermost diameter disposed maximally from said axis of rotation;

said outermost diameter of said cup spring contacts said pressure plate; and said innermost diameter of said cup spring contacts said at least a portion of said first side of said plurality of bolt heads.

23. The friction clutch according to claim 22 wherein:

said pressure plate has a first side facing said clutch disc and a second side disposed opposite said first side of said pressure plate;

said friction clutch further comprises:

at least one bolt means fixedly attached to said second side of said pressure plate;

said at least one bolt means is disposed radially outside said outermost diameter of said membrane spring;

lever means for transferring the biasing force of said membrane spring to said pressure plate to bias said pressure plate away from said clutch disc, said lever means contacting said outermost diameter of said membrane spring at least during operation of said friction clutch; and said lever means comprising means for receiving said at least one bolt means, said at least one bolt means being disposed within said receiving means of said lever means.

24. The friction clutch according to claim 23 wherein:

said lever means comprises means for clamping said at least one bolt means at least upon the application of the biasing force of said membrane spring;

said lever means comprises:
said means for maintaining;
an outer terminal portion disposed maximally from said axis of rotation and an inner terminal portion disposed minimally from said axis of rotation, said inner terminal portion being disposed adjacent and making contact with said outermost diameter of said membrane spring;

said housing comprises at least one stop portion disposed radially outside said at least one bolt means;

said outer terminal portion of said lever means makes contact with said at least one stop portion at least when said pressure plate is in said engaged position; and said means for compensating further comprises:
said lever means; and
at least one spring disposed about said at least one bolt means and between said housing and said lever means, for biasing said lever means towards said pressure plate.

25. The friction clutch according to claim 24 wherein:

said at least a portion of said second side of ones of said plurality of bolt heads comprises a first bearing area and a second bearing area;

said membrane spring contacts at least said first bearing area in said engaged position of said pressure plate;

said membrane spring contacts at least said second bearing area in said disengaged position of said pressure plate;

said first bearing area has a first bearing diameter; and said second bearing area has a second bearing diameter, said first bearing diameter being greater than said second bearing diameter.

26. The friction clutch according to claim 25 wherein:

said cup spring has a first side facing said pressure plate and a second side disposed opposite said first side of said cup spring;

said first side of said cup spring contacts said pressure plate and said second side of said cup spring contacts said at least a portion of said first side of said plurality of bolt heads;

said plurality of spacer bolts extend substantially axially from said housing toward said pressure plate, ones of said plurality of spacer bolts being fixedly attached to said housing;

said membrane spring further comprises a plurality of openings for receiving ones of said plurality of spacer bolts;

said pressure plate has an outermost diameter disposed maximally from said axis of rotation and an innermost diameter disposed minimally from said axis of rotation;

said pressure plate further comprises a projecting portion disposed adjacent said outermost diameter and extending substantially axially from said pressure plate towards said housing;

said outermost diameter of said cup spring contacts said projecting portion of said pressure plate to bias said pressure plate towards said clutch disc;

said clutch disc comprises:
a first side facing said pressure plate and a second side opposite said first side of said clutch disc;
friction linings disposed on said first side and said second side of said clutch disc;

said means for compensating compensates for wear of said friction linings of said clutch disc;

said at least one bolt means comprises a plurality of bolts;

said housing comprises an inner portion disposed radially inward from said plurality of spacer bolts;

said membrane spring comprises a plurality of tongues disposed adjacent said innermost diameter of said membrane spring;

said membrane spring has an intermediate portion disposed between said outermost diameter of said membrane spring and said innermost diameter of said membrane spring;

said membrane spring has a pre-installation position in which said outermost diameter of said membrane spring is out of substantial contact with said inner terminal portion of said lever means, and said intermediate portion of said membrane spring is in contact with said inner portion of said housing such that said membrane spring attempts to exert a releasing force on said pressure plate;

said friction clutch further comprises a counterthrust plate disposed adjacent said clutch disc, said counterthrust plate contacting said clutch disc in said engaged position of said pressure plate;

said first and second bearing areas being configured such that said force exerted by said membrane spring on said pressure plate as said pressure plate moves from said engaged position to said disengaged position increases;

said housing has an outermost diameter disposed maximally from said inner portion of said housing, said housing being non-rotatably attached to said counterpressure plate at said outermost diameter;

said housing comprises a first plurality of openings disposed adjacent said inner portion of said housing, each one of said plurality of spacer bolts being disposed in a corresponding one of said first plurality of openings of said housing; and said housing comprises a second plurality of openings disposed adjacent said outermost diameter of said housing, each of said plurality of bolts being disposed in corresponding ones of said second plurality of openings of said housing.

* * * * *

UNITED STATES PATENT AND TRADEMARK OFFICE
CERTIFICATE OF CORRECTION

PATENT NO. : 5,579,881
DATED : December 3, 1996
INVENTOR(S) : Reinhold WEIDINGER It is certified that error appears in the above-indentified patent and that said Letters Patent is hereby corrected as shown below:

In column 4, line 21, before 'are', delete "blots" and insert --bolts--.

In column 9, line 37, after 'another' insert --out.--.

In column 12, line 61, after 'essentially' insert --remains constant in spite of wear.--.

In column 15, line 30, after '0.67' insert --cm,--.

Signed and Sealed this

Twenty-fifth Day of March, 1997

Attest:

BRUCE LEHMAN

*Attesting Officer*     *Commissioner of Patents and Trademarks*